US011868916B1

(12) United States Patent
Li et al.

(10) Patent No.: US 11,868,916 B1
(45) Date of Patent: Jan. 9, 2024

(54) SOCIAL GRAPH REFINEMENT

(71) Applicant: Snap Inc., Santa Monica, CA (US)

(72) Inventors: Jia Li, Marina Del Rey, CA (US); Jie Luo, Marina Del Rey, CA (US); Ji Yang, Urbana, IL (US); Lin Zhong, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 923 days.

(21) Appl. No.: 15/675,651

(22) Filed: Aug. 11, 2017

Related U.S. Application Data

(60) Provisional application No. 62/374,669, filed on Aug. 12, 2016.

(51) Int. Cl.
*G06N 7/01* (2023.01)
*G06N 20/00* (2019.01)
*G06Q 50/00* (2012.01)
*G06N 5/048* (2023.01)

(52) U.S. Cl.
CPC .............. *G06N 7/01* (2023.01); *G06N 20/00* (2019.01); *G06Q 50/01* (2013.01); *G05B 2219/40438* (2013.01); *G05B 2219/40446* (2013.01); *G06N 5/048* (2013.01)

(58) Field of Classification Search
CPC ........ G06N 5/048; G06N 7/005; G06N 20/00; G06N 99/00; G06N 7/01; G06F 16/247; G06Q 50/01; G06K 9/469; G05B 2219/32373
USPC ........................................................ 706/52
See application file for complete search history.

(56) References Cited

U.S. PATENT DOCUMENTS

| | | | |
|---|---|---|---|
| 6,038,295 | A | 3/2000 | Mattes |
| 6,980,909 | B2 | 12/2005 | Root et al. |
| 7,173,651 | B1 | 2/2007 | Knowles |
| 7,411,493 | B2 | 8/2008 | Smith |
| 7,535,890 | B2 | 5/2009 | Rojas |

(Continued)

FOREIGN PATENT DOCUMENTS

CA 2887596 7/2015

OTHER PUBLICATIONS

Gong et al., "Joint Link Prediction and Attribute Inference Using a Social-Attribute Network" Apr. 2014, ACM Transactions on Intelligent Systems and Technology, vol. 5, No. 2, Art 27:1-20. (Year: 2014).*

(Continued)

*Primary Examiner* — Miranda M Huang
*Assistant Examiner* — Chase P. Hinckley
(74) *Attorney, Agent, or Firm* — Schwegman Lundberg & Woessner, P.A.

(57) ABSTRACT

A social networking application provides for automated link and/or content recommendation to users of a social media platform by automated social graph refinement that augments a baseline social graph with predicted links and inferred labels by iteratively (a) propagating attribute labels through optimizing attribute label similarity between user nodes constrained by closeness of links between the users, and (b) predicting links between users through optimizing link closeness constrained by label similarity. Each label inference iteration is based on predicted labels generated in and immediately prior link prediction iteration, and each link prediction iteration is based on inferred labels generated in and immediately prior label inference iteration.

18 Claims, 11 Drawing Sheets

(56) References Cited

U.S. PATENT DOCUMENTS

| | | | |
|---|---|---|---|
| 8,131,597 B2 | 3/2012 | Hudetz | |
| 8,185,558 B1* | 5/2012 | Narayanan | G06F 16/24 707/798 |
| 8,199,747 B2 | 6/2012 | Rojas et al. | |
| 8,332,475 B2 | 12/2012 | Rosen et al. | |
| 8,718,333 B2 | 5/2014 | Wolf et al. | |
| 8,724,622 B2 | 5/2014 | Rojas | |
| 8,838,512 B2* | 9/2014 | Yan | G06F 16/951 707/765 |
| 8,874,677 B2 | 10/2014 | Rosen et al. | |
| 8,909,679 B2 | 12/2014 | Root et al. | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,082,082 B2* | 7/2015 | Jebara | G06Q 50/00 |
| 9,092,483 B2* | 7/2015 | Brockett | G06F 16/24534 |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,384,571 B1* | 7/2016 | Covell | G06Q 10/10 |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,679,247 B2* | 6/2017 | Koutra | G06N 5/048 |
| 9,704,262 B2* | 7/2017 | Baloch | G06T 7/143 |
| 9,852,231 B1* | 12/2017 | Ravi | G06N 5/02 |
| 10,002,325 B2* | 6/2018 | Sweeney | G06N 5/02 |
| 10,438,130 B2* | 10/2019 | Rossi | G06N 20/10 |
| 10,489,284 B1* | 11/2019 | Saraf | G06F 11/3688 |
| 10,650,408 B1* | 5/2020 | Andersen | G06Q 30/0275 |
| 10,769,426 B2* | 9/2020 | Guo | G06F 16/5854 |
| 10,771,572 B1* | 9/2020 | Gupta | H04L 67/535 |
| 10,776,449 B1* | 9/2020 | Rao | G06F 16/972 |
| 11,030,246 B2* | 6/2021 | Rossi | G06N 5/022 |
| 2011/0202598 A1 | 8/2011 | Evans et al. | |
| 2012/0209924 A1 | 8/2012 | Evans et al. | |
| 2014/0115010 A1* | 4/2014 | Seth | G06F 16/9024 707/798 |
| 2014/0258196 A1* | 9/2014 | Dhurandhar | G06N 7/00 706/20 |
| 2015/0032767 A1* | 1/2015 | Gao | G06F 16/3338 707/765 |
| 2015/0052098 A1* | 2/2015 | Kveton | G06N 5/02 706/52 |
| 2015/0161228 A1* | 6/2015 | Davies | G06F 16/285 707/737 |
| 2015/0213370 A1* | 7/2015 | Chakrabarti | G06N 7/005 706/52 |
| 2016/0070817 A1* | 3/2016 | Aggarwal | G06F 16/24568 707/798 |
| 2017/0017886 A1* | 1/2017 | Gao | G06Q 30/02 |
| 2017/0053208 A1* | 2/2017 | Krishnamurthy | G06F 16/9024 |
| 2017/0083916 A1* | 3/2017 | Fadli | G06Q 30/0246 |
| 2017/0091692 A1* | 3/2017 | Guo | G06Q 10/06393 |
| 2017/0206470 A1* | 7/2017 | Marculescu | H04L 51/32 |
| 2017/0244778 A1* | 8/2017 | Zhu | H04L 67/22 |
| 2017/0316099 A1* | 11/2017 | Xu | G06Q 30/02 |
| 2017/0351681 A1* | 12/2017 | Bekas | G06F 16/24578 |
| 2017/0351769 A1* | 12/2017 | Karakas | G06F 16/9024 |
| 2017/0371868 A1* | 12/2017 | Zhang | G06F 40/44 |
| 2017/0371965 A1* | 12/2017 | Davar | G06F 16/951 |
| 2018/0212834 A1* | 7/2018 | Levchuk | H04L 41/12 |
| 2018/0336482 A1* | 11/2018 | Yu | G06Q 50/01 |

OTHER PUBLICATIONS

Zhang et Yu, "PCT: Partial Co-alignment of Social Networks" Apr. 11-15, 2016, pp. 749-759. (Year: 2016).*

Papagelis, Manos, "Refining Social Graph Connectivity via Shortcut Edge Addition" Oct. 2015, ACM Transactions on Knowledge Discovery from Data, vol. 10, No. 2, Art 12:1-35. (Year: 2015).*

De et al., "Discriminative Link Prediction using Local, Community, and Global Signals" Jul. 5, 2016, IEEE Transactions on Knowledge and Data Engineering, vol. 28, No. 8, pp. 2057-2070. (Year: 2016).*

Zhao et al., "Link Prediction-based Multi-label Classification on Networked Data" Jun. 13-16, 2016, IEEE First International Conference on Data Science in Cyberspace, pp. 61-68. (Year: 2016).*

Le Falher et al., "On the Troll-Trust Model for Edge Sign Prediction in Social Networks" Jun. 17, 2016, pp. 1-16. (Year: 2016).*

Liu et al., "Aligning Users Across Social Networks Using Network Embedding" Jul. 9, 2016, Proceedings of the Twenty-Fifth International Joint Conference on Artificial Intelligence, pp. 1774-1780. (Year: 2016).*

Zuo, Xiang, "The Role of Social Ties in Dynamic Networks" Mar. 16, 2016, pp. i-123. (Year: 2016).*

Zheng, Quan, "Spectral Techniques for Heterogeneous Social Networks" Jan. 2016, pp. i-237. (Year: 2016).*

Kumar et al., "Discriminative and Efficient Label Propagation on Complementary Graphs for Multi-Object Tracking" Dec. 1, 2015, pp. i-14. (Year: 2015).*

Zhuang et al., "Graph Construction with Label Information for Semi-Supervised Learning" Jul. 12, 2016, pp. 1-11. (Year: 2016).*

Yao et al., "Multi-label classification via learning a unified object-label graph with sparse representation" Nov. 27, 2015, pp. 1125-1149. (Year: 2015).*

Yan et al., "Socialized Language Model Smoothing via Bi-directional Influence Propagation on Social Networks" Apr. 2016, pp. 1395-1405. (Year: 2016).*

Dong et al., "Learning Laplacian Matrix in Smooth Graph Signal Representations" Feb. 19, 2016, pp. 1-14. (Year: 2016).*

Yan et al., "Tackling the Achilles Heel of Social Networks: Influence Propagation based Language Model Smoothing" May 2015, pp. 1318-1328. (Year: 2015).*

Wang et al., "Iterative Reconstruction of Graph Signal in Low-frequency Subspace" 2014, pp. 448-452. (Year: 2014).*

Yanardag et Vishwanathan, "A Structural Smoothing Framework For Robust Graph-Comparison" 2015, pp. 1-9. (Year: 2015).*

Pimplikar et al., "Learning to Propagate Rare Labels" Nov. 2014, pp. 201-210. (Year: 2014).*

Eslamlou et al., "Graph Signal Recovery from Incomplete and Noisy Information using Appropriate Message Passing" Mar. 20, 2016, pp. 6170-6174. (Year: 2016).*

Jiang et al., "Inferring lockstep behavior from connectivity in large graphs" Oct. 15, 2015, pp. 399-428. (Year: 2015).*

Guo et al., "Semantically Smooth Knowledge Graph Embedding" Jul. 2015, pp. 84-94. (Year: 2015).*

Libbrecht et al., "Entropic Graph-based Posterior Regularization" Jun. 1, 2015. (Year: 2015).*

Ricatte et al., "Hypernode Graphs for Spectral Learning on Binary Relations over Sets" Jan. 18, 2015, pp. 1-11. (Year: 2015).*

Shahid et al., "Robust Principal Component Analysis on Graphs" 2015, pp. 2812-2820. (Year: 2015).*

Chen et al., "Marginalized Denoising for Link Prediction and Multi-label Learning" Feb. 18, 2015, pp. 1707-1713. (Year: 2015).*

Narayanan et al., "subgraph2vec: Learning Distributed Representations of Rooted Sub-graphs from Large Graphs" Jun. 29, 2016. (Year: 2016).*

Shahid et al., "Low-Rank Matrices on Graphs: Generalized Recovery & Applications" May 25, 2016, pp. 1-37. (Year: 2016).*

Peng, Huan-Kei, "Understanding and Engineering Social Dynamics" Feb. 3, 2016, pp. i-146. (Year: 2016).*

Kalofolias, Vassilis, "How to learn a graph from smooth signals" Jan. 11, 2016. (Year: 2016).*

Liu et al., "A link prediction algorithm based on label propagation" Mar. 29, 2016, pp. 43-50. (Year: 2016).*

Zoidi et al., "Graph-Based Label Propagation in Digital Media: A Review" Apr. 2015, pp. 1-35. (Year: 2015).*

Grover et Leskovec, "node2Vec: Scalable Feature Learning for Networks" Jul. 3, 2016, arXiv: 1607.00653v1, pp. 1-10. (Year: 2016).*

Perozzi et al., "Walklets: Multiscale Graph Embeddings for Interpretable Network Classification" May 6, 2016, arXiv: 1605.02115v1, pp. 1-16. (Year: 2016).*

(56) References Cited

OTHER PUBLICATIONS

Li et al., "Replacing the Irreplaceable: Fast Algorithms for Team Member Recommendation" Sep. 19, 2014, arXiv: 1409.5512v1, pp. 1-10. (Year: 2014).*
Lan et al., "Learning Social Circles in Ego Networks based on Multi-View Social Graphs" Jul. 16, 2016, arXiv: 1607.04747v1, pp. 1-30. (Year: 2016).*
Mahdizadehaghdam et al., "Information Diffusion of Topic Propagation in Social Media" Feb. 15, 2016, arXiv: 1602.04854v1, pp. 1-13. (Year: 2016).*
Zhu et al., "Scalable Temporal Latent Space Inference for Link Prediction in Dynamic Social Networks" Jul. 13, 2016, pp. 1-16. (Year : 2016).*
Leyden, John, "This SMS will self-destruct in 40 seconds", [Online]. Retrieved from the Internet: URL: http://www.theregister.co.uk/2005/12/12/stealthtext/, (Dec. 12, 2005), 1 pg.

* cited by examiner

SOCIAL GRAPH REFINEMENT

PRIORITY APPLICATION

This application claims priority to U.S. Provisional Application Ser. No. 62/374,669, filed Aug. 12, 2016, the disclosure of which is incorporated herein in its entirety by reference.

BACKGROUND

Two of the most prevalent user activities on social networks are (1) connecting to existing and new friends and (2) exchanging information with such friends, contacts, or links. Recently, social media applications have additionally become a primary information source for users to consume news stories. These activities have many benefits both to the users and to the providers of the social media applications.

A problem for users associated with these developments, however, is that they can often be inundated with a flood of information from social media networks shared by their friends and other content providers. The problem for providers of such social media applications is that the identification of accurate and effective content targeting (e.g., advertisement targeting or content recommendation) and/or friend recommendations is complicated by incomplete and/or noisy social network information.

For systems and entities that provide social media network applications, it is therefore useful to understand users' behaviors in order better to serve the users' need. This often involves investigating users' friendships/relationships, as well as their interests. However, given the nature of online social media applications in reality, information on both user links and interests is typically highly incomplete and noisy.

Social graph information relevant to these considerations thus includes (a) links between users, and (b) attributes indicative of or related to different interests, demographic information, or other personal information individual users. Such attributes are referred to herein as labels. To improve services provided based on social graphs, graph refinement in the form of predicting nonexisting links or inferring nonexistent labels has been proposed.

On the one hand, predicting non-existing links in large networks directly enables services like link recommendation that adds value for both users and businesses. The typical goal is to complete the networks, with predicted links that can form but have not formed. On the other hand, inferring user labels (such as location and interest) is valuable in tasks like advertising targeting or content targeting, which improves business efficiency as well as user experience. The basic objective is also to refine or complete noisy or incomplete networks, with inferred labels assigned to originally unlabeled users.

BRIEF DESCRIPTION OF THE SEVERAL VIEWS OF THE DRAWINGS

Various features of the disclosure are illustrated by way of example, and not by way of limitation, in the figures of the accompanying drawings in which.

DETAILED DESCRIPTION

General Overview

Figure 1:
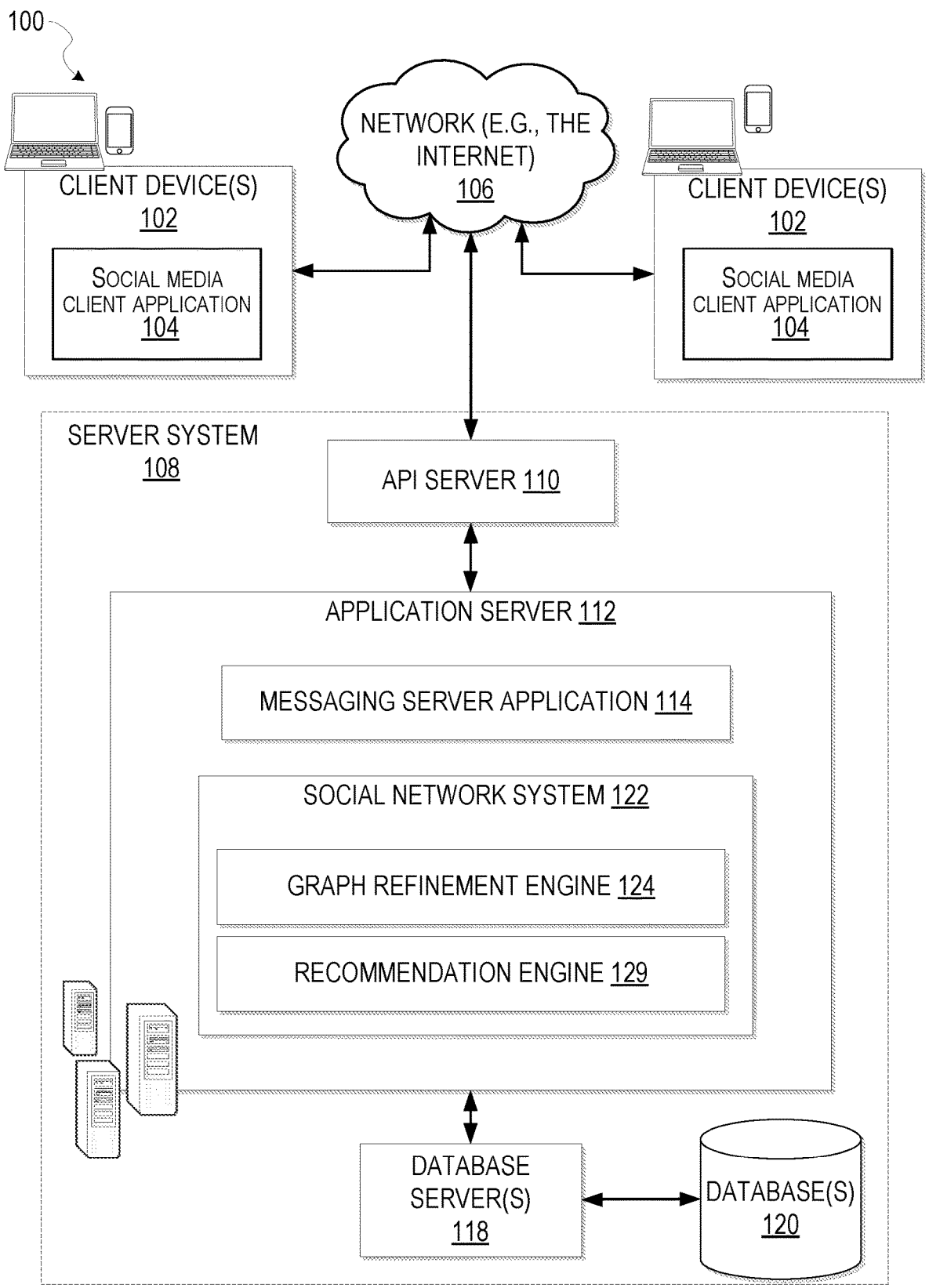
FIG. 1 is a block diagram showing an example social media application system providing a platform for sharing social media content (e.g., messages, associated content, media content links, and the like) over a network.

One aspect of this disclosure provides a system for and a method of modeling social media application users' friendships (e.g., represented by links) and their interests and/or other attributes (e.g., represented by labels) together on a social graph. A baseline social graph constructed based on existing links between users and existing labels associated with respective users is dynamically refined by growing both the friendships and interests based on the phenomenon of homophily, which provides that the two properties are highly interleaving. User interests are encoded into labels and friendships are encoded into links, whereafter incomplete/absent links and labels are learnt jointly in an automated social graph refinement operation by leveraging the data redundancy of both links and labels, thus helping each other.

Graph smoothness can be expressed as a function both of the closeness or strength of links between users and of the similarity of labels (or, in some examples, a suite of labels) associated with respective users. In some embodiment, the disclosed techniques provide for exploiting homophily by iteratively addressing smoothness on the graph in two directions, i.e., from closeness to similarity (stronger links lead to more similar labels), and vice versa. The two processes are in such cases done in a unified probabilistic framework through label propagation and graph construction. The refined user links and labels indicated by the resultant refined social graph are immediately useful for various tasks including link prediction and recommendation on social networks.

The method may thus include automated performance of a social network application function based on the refined social graph. In some embodiments, for example, the social network application includes a recommendation engine that generates automated social media recommendations based on analysis of the refined social graph. Such recommendations may include provision of link recommendations or suggestions in a social network user interface, for example comprising the recommendation to a user of a number of other users with whom the user can connect. Instead, or in addition, the recommendation engine can employ the refined social graph in the automated provision of content recommendations based at least in part on one or more inferred labels assigned to users during graph refinement. Such content recommendations in some embodiments include, for example, suggesting to a particular user a number of products, topics, movies, or the like, in which the user has an above-threshold probability of interest, based on the refined labels associated with that user. Instead, or in addition, automated advertisement targeting may be performed with respect to particular users based on the associated refined labels inferred to those users during graph refinement.

As discussed previously, each of the two problems of link prediction and label inference is challenging due to the nature of incompleteness and noise in social networks. The disclosed techniques is based on the observation that user links and labels are highly interleaving, as expressed for example by the concept of homophily in network data. Note that homophily is bi-directional, i.e., 1) users linked to each other tend to share similar labels, and 2) users with more similar labels tend to be linked more closely. Based on the bi-directional homophily, the disclosed techniques provide for jointly learning user links and labels on social graphs.

Some existing methods combine links and labels in a static way by learning user embeddings. Examples of such existing methods include "Like like alike: joint friendship and interest propagation in social networks," Yang, et al., *Proceedings of the 20$^{th}$ international conference on Worldwide web*, pages 537-546. ACM, 2011. This disclosure, however, provides for dynamically growing the social graph by iteratively learning user links based on refined user labels, and inferring user labels based on learned or predicted user links, aiming to fully leverage the interactions and mutual reinforcement between labels and links. Note that dynamic growing or refining of the social graph in this context means not that the social graph grows or changes based on user-driven changes in the underlying social network data responsive to the establishment by users of new links or new labels, but instead means that the social graph is progressively amplified or augmented with predicted links and inferred labels based on the static underlying social network data.

Providing link or content recommendations based on predicted links and/or inferred labels can, however, promote formal establishment of links between users (e.g., responsive to accepting a link recommendation in a social media application) and/or positive assignment of labels to respective users (e.g., responsive to consenting specific media content prompted by a content recommendation), thus growing or completing the baseline social graph based on actual social network data.

Some aspects of the methods and systems for dynamic graph refinement as disclosed herein provide a unified probability framework to address challenges in coherently combining links and labels, and properly constructing the graph. Some traditional graph learning scenarios (e.g. Lin et al., "Geodesic distance function learning via heat flow on the vector fields," in *Proceedings of the 31$^{st}$ International Conference on Machine Learning*, 2014) utilize affinity graphs with relatively wide leverage. In some embodiments, the disclosed unified probability framework models two separate proximities on social graphs for the links and the labels respectively. As mentioned, label proximity is in some embodiments modeled as similarity, and link proximity is modeled as closeness.

In some embodiments, the method thereafter includes inferring labels and/or predicting links based at least in part on increasing smoothness in the modeled social graph, e.g., by aligning similarity and closeness. Example embodiments of these operations are described in greater depth later herein. The framework thus employed by the disclosed method enables rigorous label inference based on links (e.g., via label propagation (LP)), and enables recovery or prediction of links based on labels (e.g., via graph construction (GC)). The disclosed system is in some embodiments configured to provide designed iteration interfaces and pipelines that employs a novel Graph Construction with Label Propagation (GCLP) procedure that iteratively addresses smoothness on social graphs in two directions through LP and GC. The proposed GCLP can also be referred to as bidirectional joint inference for user links and attributes (BLA).

In some embodiments, probability interpretations of both label similarity and link closeness during the GCLP iterations are maintained by performing a normalization operation. Instead, or in addition, over-construction of the refined graph is counteracted by performing a regularization operation during the GCLP iterations.

Example embodiments of the above-discussed methods and systems will now be described in greater detail. The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

FIGS. 1-5 describes an example embodiment of a particular social network application environment in the example form of a social media messaging system (analogous to the SnapChat™ messaging platform provided by Snap, Inc.) within which the disclosed dynamic social graph refinement techniques may be implemented, including description of various system components that implement the social network application, a social graph refinement engine, and a recommendation engine according to an example embodiment. These features will be described in greater detail later herein.

Overview of Example Graph Refinement Framework

Figure 6A:
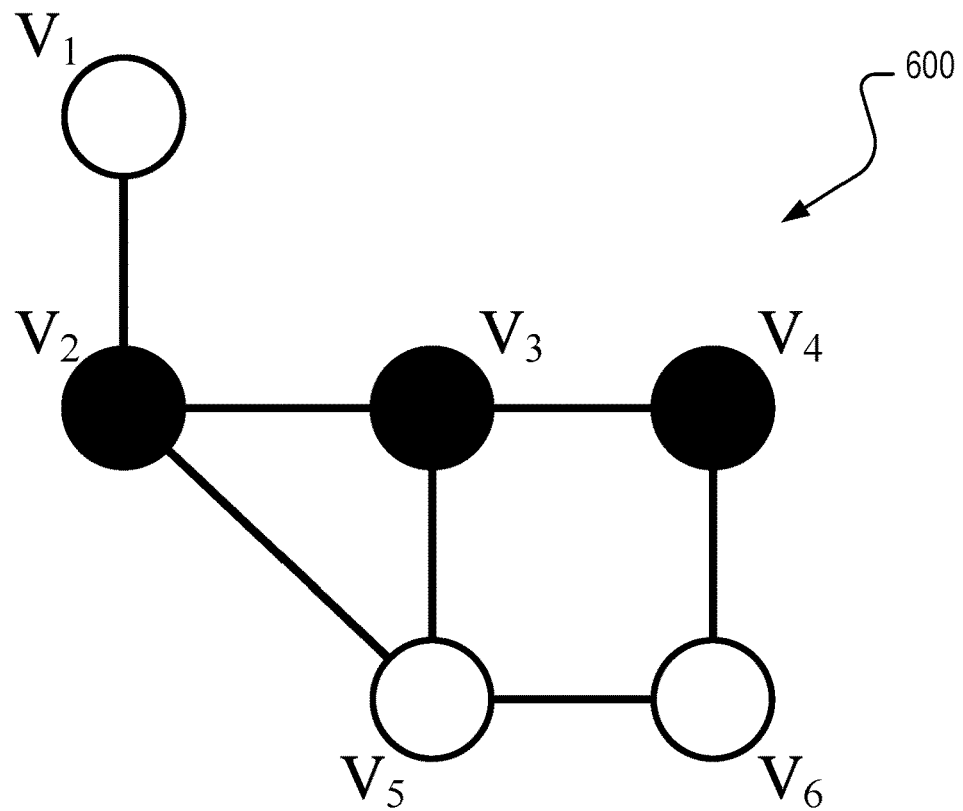
FIG. 6A-6C is a series of highly simplified graphs illustrating sequential steps in a graph construction and label propagation framework according to one example embodiment.

First, however, the social graph refinement functions together with its theoretical underpinnings will be described at length. Turning for this purpose to FIG. 6, therein is shown example operation of an example GCLP process with reference to a highly simplified social network graph structure. As previously described in broad terms, the example GCLP of FIG. 6 dynamically leverages the mutual reinforcement between user links and labels. In FIG. 6A, graph 600 is the original or baseline graph, where nodes $\{v_i\}_{i=1}^{6}$ represent respective users, with solid lines between the nodes representing edges indicating existing links between respective users. Predicted links are indicated in FIGS. 6B and 6C by broken lines between respective notes, with the probability of a particular link's existence being indicated by the thickness of the corresponding line.

Figure 6B:
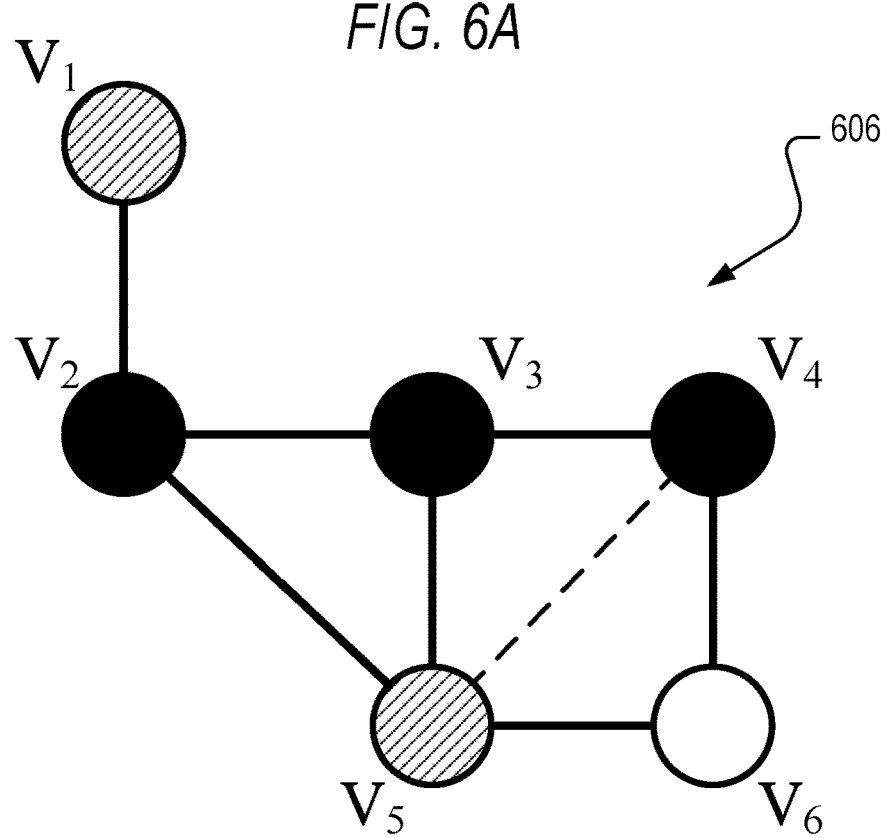
Figure 6C:
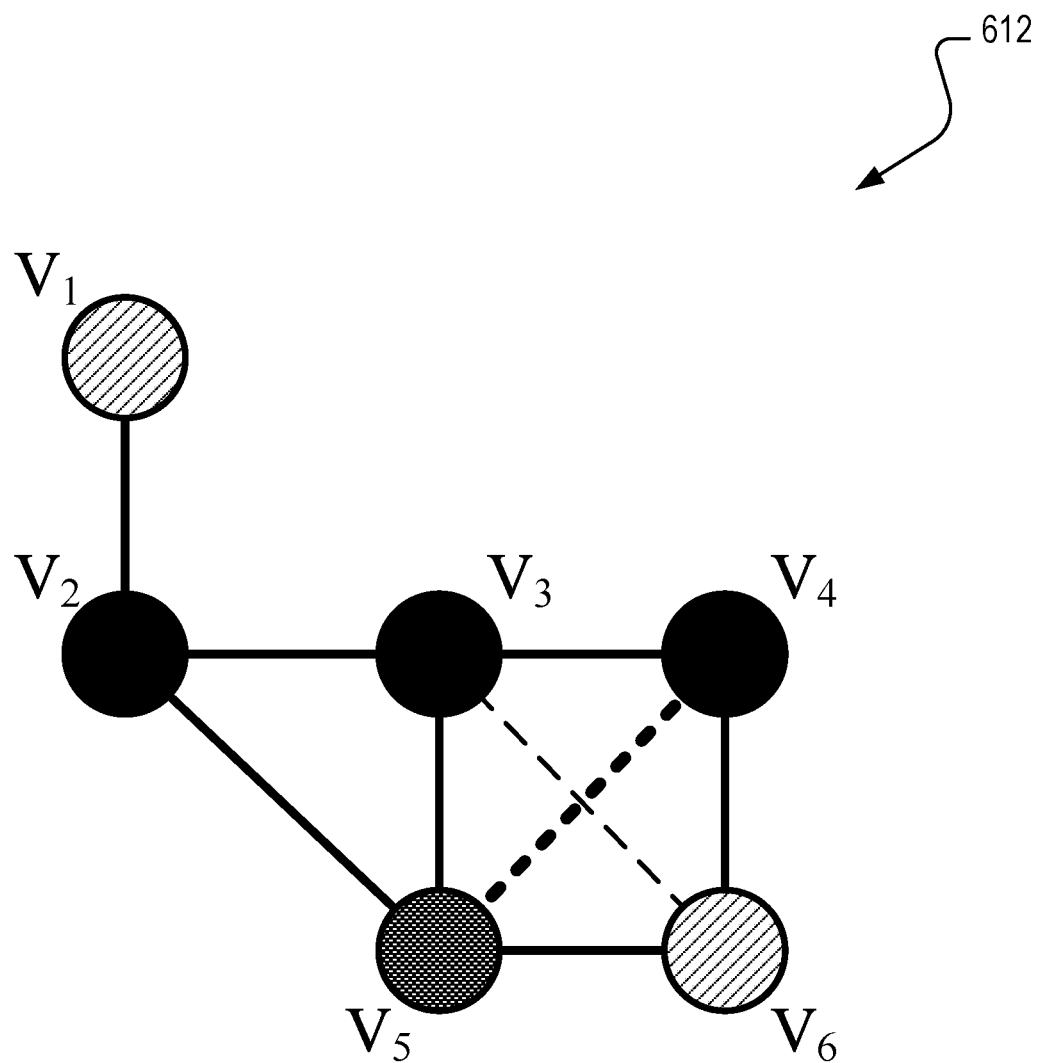

In FIG. 6A-6C, the darkness of a node indicates its estimated probability of having label L. $v_2$, $v_3$ and $v_4$ are labeled with example label L, e.g., here indicating that the respective users graduated in common from a particular school. Since neither labels nor links are complete in an initial graph 600, it is hard to precisely predict the unknown labels and missing links. For example, it is hard to directly tell either $v_1$ or $v_5$ is more likely to possess L. Likewise, insufficient information initially exists to predict with any degree of certitude whether link $e_{36}$ (i.e., an edge connecting nodes $v_3$ and $v_6$) or $e_{45}$ (between $v_4$ and $v_5$) is more likely to exist or to be formed in future.

In FIGS. 6B and 6C, graphs 606 and 612 illustrate the dynamic learning process of GCLP that refines both labels and links. Specifically, after a first round of label propagation (LP) (see, e.g., operation 808 in the method 800 of FIG. 8, together with associated description), $v_1$ and $v_5$ are inferred with similar label probabilities, and then, after the first round of link predictive graph construction (GC) (see, e.g., operation 816 in the method 800 of FIG. 8, together with associated description), a weak link $e_{45}$ is predicted between $v_4$ and $v_5$ (see graph 606, FIG. 6B). Later on, due to the existence of $e_{45}$, L is inferred to $v_5$ with a higher probability than $v_1$ and $v_6$. As a further consequence, $e_{45}$ is predicted as more probable to exist than $e_{36}$, as schematically illustrated by graph 612, FIG. 6C. It will thus be seen that, the disclosed GCLP system starts from learning the most probable links and labels and then continues to further augment the graph step by step.

Note that, as will become evident from the discussion that follows, the example GCLP employs regularization to converge at graphs like graph 612 of FIG. 6C, rather than to iterate to an over-construction in which L is assigned to all nodes and a link is predicted between every pair of nodes.

Besides the challenges brought by the incompleteness and noise of both links and labels, the extremely large scales of real world social networks severely prohibit the direct application of most traditional GC and LP algorithms on graphs. E.g., on a large social graph with millions of users and their links, simply counting the mutual friends among each pair of users takes days to finish using an advanced personal computer. To address the efficiency of GC and LP on social graphs, some embodiments employ a novel sampling technique that significantly reduces computation without sacrificing performance. A scalable map-reducing pipeline is in some such embodiments implemented with Spark GraphX (see, for example, Zaharia, et al. "Spark: Cluster Computing with Working Sets," *HotCloud*, 10:10-10, 2010), utilizing the aggregate and pregel functions. The example graph refinement framework furthermore provides the flexibility to plug in various probability adjustment and regularization.

Overview Summary

In some embodiments, a unified probabilistic framework is provided to dynamically learn user links and labels, which leverages the data redundancy on each side (links and labels) and the mutual reinforcement between them. An efficient GCLP pipeline is implemented on real world huge social graphs with a novel edge sampling method and optimize it to fully utilize the scalable GraphX and map-reduce functions of Spark. The GCLP framework integrates novel disclosed data sub-models in the form of an adaptive label significance model and/or a dynamic user activeness model.

TECHNICAL BACKGROUND

The novel disclosed GCLP is closely related to three groups of algorithms: graph construction, label propagation and graph embedding. Graph construction (GC) is an existing technique for modeling network data, including social networks. It basically constructs a G={V, E, A}, where V is the set of nodes (users), E is the set of edges (links) and A is the set of labels associated with V. However, in social networks, E is typically severely sparse and incomplete, i.e., many links that can form do not form on the graph, which motivates the task of link prediction.

Traditional link prediction methods are mostly based on the topology of existing links, leveraging quantities such as edge density and node degree, while some also utilize random walk or spectral algorithms. Contrary to the techniques disclosed herein, these methods do not leverage the rich information in A.

Label propagation (LP) is an existing techniques of inferring node labels based on link structure. However, existing methods of LP focuses on either efficient propagation of labels or on fast approximation of affinity graphs, rather than refining graphs with noisy data. In social networks, the lack of precise and complete link structure puts unique challenges on the inference task, which usually leads to poor performances. Specifically, LP enforces the nodes to share similar labels if they are measured as close on the graph. This effective only when the closeness is systematically enumerated everywhere, i.e., links between any pair of nodes exist and are properly weighted. This is not the case in social networks, where E is incomplete and unweighted. Therefore, propagating labels directly on E seldom leads to satisfactory results.

Existing techniques of graph embedding (GE) combine A and E. Learned through an embedding w.r.t. both link structure and original labels, the vector representations of users are directly fed to of-the-shelf machine learning algorithms for specific analytical tasks. However, contrary to the dynamic graph refinement disclosed herein, the links and labels used to learn the embeddings are both static.

Differently from these existing techniques, GCLP coherently integrates a GC process and an LP process to iteratively learn user links and labels, which effectively leverages the data redundancy on each side (links and labels) and the mutual reinforcement of two sides to predict or estimate highly augmented social graphs.

Graph Refinement Functions

Link probabilities and attribute probabilities are used to formulate social graphs which can better model user links and their attributes under noisy environment. Instead of using binary values to represent the graph, probabilities profile user links and attributes in a finer granularity, and relative strengths are naturally comparable within the legitimate probability scale. In some embodiments, graduated probability values are thus assigned to predicted links and inferred labels (as opposed to the assignment of binary values). In some embodiments, at least some of the links and labels extracted from social network data in initializing or constructing the baseline social graph are likewise modeled with graduated values that represent the respective strengths of the corresponding links, and that represent a level of interaction of the respective user with the corresponding label. The learning problem can be formally defined as described below.

INPUT: Given a social network data in the form of social network S, its set of users is extracted as V, their existing links as E, and the attribute assignment (i.e., the labels) to each of the users as A. In this case, the network S can be represented as a baseline graph G={V, E, A}. For most common social networks, the observed edge $e_{ij}$ in E is usually binary, with 1 indicating the existence of a connection between user $v_i$ and user $v_j$ and 0 otherwise. A records attributes of every user. Specifically, each node $v_i$ is associated with a label vector $a_i$, each component of $a_i$ is a binary value that represents whether user $v_i$ is labeled with a specific attribute.

OUTPUT: The objective is to learn a complete and predict refined social graph $G^*=\{V, W, Y\}$, where each pair of user nodes $v_i$ and $v_j$ is connected by a link with a weight $w_{ij} \in [0, 1]$, $\forall w \in W$, which encodes the probability of the relevant two users to share a link, and each node $v_i$ is associated with a label vector $y_k \in [0, 1]$, $\forall y \in Y$, where each component of $y_i$ encodes the probability of user i to possess the relevant attribute.

Learning Paradigm

The GCLP model exploits the bi-directional homophily theory:

1) Users are more likely to link with users with whom they share more similar attributes; and
2) Users are more likely to share similar attributes with users with whom they link more closely.

The above properties are implemented in a principled way by addressing smoothness, e.g., aligning label similarity and link closeness on the social graph in two directions. On one hand, W is used to encode the predicted weights of every possible link on G, where $w_{ij}$ can be interpreted as the link closeness between $v_i$ and $v_j$ on G, differentiating closer friends (with stronger links) and general friends (with weaker links). On the other hand, Y represents the inferred attributes on every node of G. Thus, $y_i$ and $y_j$ can be used to compute the label similarity between two users $v_i$ and $v_j$. With similarity and closeness well defined, the first properties of GCLP can be implemented through computing closeness based on similarity, while the second property addressed by constraining similarity with respect to closeness. An example of such alternate label inference iterations based at least in part on predicted links, and link prediction iterations based at least in part on inferred labels to the operations 808 and 816 of the example embodiment described with reference to FIG. 8.

Learning W

The dynamic graph refinement framework is based in part on development of a suitable GC method. On social graphs, the link structures are usually incomplete and the edge weights are often missing. For example, a typical Facebook user is connected to about 100 out of more than one billion users of the network, leaving many links that can possibly be formed missing. In addition, links between different pairs of friends are in binary forms from observation, while their strength which indicate the closeness of the friend relationship are not the same.

To properly construct a complete and weighted links W, the method may in some examples resort to paths in the network. For each pair of nodes, the framework in some embodiments account for two quantities: the number and the importance of paths between them. Moreover, it is expected that W should always have the proper probability meaning.

In this example embodiment, the random walk theory provides a principled solution. See, for example Fang et al., "Graph-based semi-supervised learning: Realizing pointwise smoothness probabilistically," in ICML (2014); and Yin et al., "A Unified Framework for Link Recommendation using Random Walks," In *Advances in Social Networks Analysis and Mining (ASONAM)*, 2010 *International Conference on* (2010), IEEE, pp. 152-159. Specifically, the one-step transition probability of a random walker from $v_i$ to $v_j$ measures the direct closeness between $v_i$ and $v_j$ in $v_i$'s view, i.e., $p_{ij}^1 = w^{ij}/d_i$ ($d_i = \Sigma_j w_{ij}$).

Therefore, the importance of different edges is properly differentiated, because it is often the case that the more links one node has, the less important each link is to it on average. However, since direct closeness is severely sparse and incomplete, we intuitively extend the random walk length and use the K-step transition probabilities as a measure of the complete closeness, i.e., $p_{ij}^K = \Sigma_{\iota \in I} p_\iota^K$.

I is the set of all K-step paths between $v_i$ and $v_j$ and $$p_\iota^K = \prod_{k=1}^K p_k^1;$$

where $p_k^1$ is the one-step transition probability on the kth edge passed by path ι. The multiplication of probabilities differentiates the importance of each path and the summation over all paths takes the number of paths into consideration. As suggested by the first property of GCLP, we simply set K=2, so as to combine the individual closeness of $v_i$ and $v_j$ to their mutual friends to infer the actual closeness between $v_i$ and $v_j$. While K=2 leads to efficient computations, since data analysis on typical social networks suggests that links between users without any mutual friends are extremely rare, completeness of constructed graph is still guaranteed.

While measuring two-step transition probabilities efficiently implements the first property of GCLP, we aim to further incorporate user labels into the process of computing W by implementing the second property. Specifically, before computing the two-step transition probabilities, we manually adjust each one-step transition probability $p_{ij}^1$ by multiplying a label similarity scaler $s_{ij}=\text{sim}(y_i,y_j)$ (such as the cosine similarity) and then renormalize $\{p_i\}$ on each node. In this way, the random walker is required to 'prefer' edges connecting nodes with more similar labels, leading to link closeness aligned with label similarity.

Note that, while label similarity leads to properly adjusted transition probabilities, other insightful adjustment can also be applied in other embodiments. Moreover, various choices of similarity scalers may also lead to different performances. We will discuss more about the flexibility of GCLP w.r.t. various probability adjustments below. The objective function of GC in this example embodiment is as following, $$J_{GC} = (1-\beta)\Sigma_{e_{ij} \neq 0}(w_{ij}-e_{ij})^2 + \beta \Sigma_{i,j}(w_{ij}-p_{ij})^2, \quad (1)$$

where $e_{ij}$ is the binary value indicating the existence of direct edge between $v_i$ to $v_j$ and based on E, and $p_{ij}$ is the adjusted pathwise transition probability (here the two-step transition probability) from $v_i$ to $v_j$. β controls the tradeoff between the two terms, according to how much adjustment we want to make on the original link structure.

Note that Equation (1) provides a graph construction objective function indicative of link closeness, and is at least in part a function of label similarity by employment of the similarity scaler in calculation of the transition probabilities between respective pairs of nodes. Optimization of Equation (1) thus optimizes respective link probabilities constrained at least in part by corresponding label similarity.

Inferring Y

One existing way to infer labels on the graph is through LP, which aims to reliably label all data points based on a limited number of labeled ones and an affinity graph describing the closeness among all points. It usually learns a labeling function $y=f(\cdot)$, with the objectives of 1) generating the correct labels for labeled points and 2) generating similar labels for points that are close on the affinity graph. Improving the quality of Y based on A and E (or W) is here considered intrinsically similar to that of LP.

In this embodiment, it is specifically required that users get larger influences from friends with stronger links, which implements the third property of GCLP, and the final labels are based on the summation of the influences from all linked friends, which implements the fourth property. Therefore, we adopt LP to infer labels for all users by constraining label similarity according to closeness on the graph. We have the objective function of LP as following, $$J_{LP}=(1-\alpha)\Sigma_{a_i\neq 0}(y_i-a_i)^2+\alpha\Sigma_{i,j}w_{ij}(y_i-y_j)^2, \quad (1)$$

where $y_i$ and $a_i$ can be either single labels or vectors of multiple labels.

If multiple labels are concerned, propagation can be done separately for each of them. It provides an efficient and principled way to infer user labels, where the first term leverages the directly available labels A in S, and the second term implements the last two properties of GCLP, which enables the propagation of label probabilities Y based on the weighted user links W. The propagation strength $\alpha$ controls the tradeoff between the two terms. The results of LP are always normalized w.r.t. each label to maintain the label probability interpretation in the principled framework.

Note, again that equation (2) is a label propagation objective function indicative of label similarity, and is at least in part a function of link closeness on the graph by employment of the link weighing factor ($w_{ij}$) in the second term of the function. Optimization of Equation (2) thus optimizes respective label probabilities constrained at least in part by corresponding link closeness.

Scalable GCLP Learning

Combining Eq. 1 and 2, the objective of the GCLP procedure is set as to solve the following optimization problem:

$$\hat{w},\hat{y}=\operatorname{argmin}_{w,y} J_{GC}+J_{LP}. \quad (3)$$

From the foregoing, it will be seen that Equation (3) is an objective expression that models graph features as a function both of (a) label similarity constrained by link closeness, and (b) link closeness constrained by label similarity. As a result, the objective expression can be viewed as being constrained by graph smoothness, so that optimization of the expression addresses graph smoothness. The optimization problem is non-trivial, because W and Y intervene in both Eq. 1 and Eq. 2. Therefore, an iterative learning process is adopted that is intrinsically similar to the block coordinate descent approach (see, e.g., Xu et al., "A block coordinate descent method for regularized multiconvex optimization with applications to nonnegative tensor factorization and completion," *SIAM Journal on imaging sciences* 6, 3 (2013), 1758-1789.

Description of Example Embodiment

An example embodiment of a method for link refinement and the provision of social media recommendations based on the GCLP framework will now be discussed with reference to the flowcharts 700 and 800 of FIGS. 7 and 8 respectively. These methods and the description that follows are to be understood in this example embodiment as being performed in a social media application environment such as that described with reference to FIGS. 1-5, in particular being performed by use of a social network system 122 having a graph refinement engine 124 and a recommendation engine 129 such as that described and illustrated with reference to FIG. 1.

Figure 7:
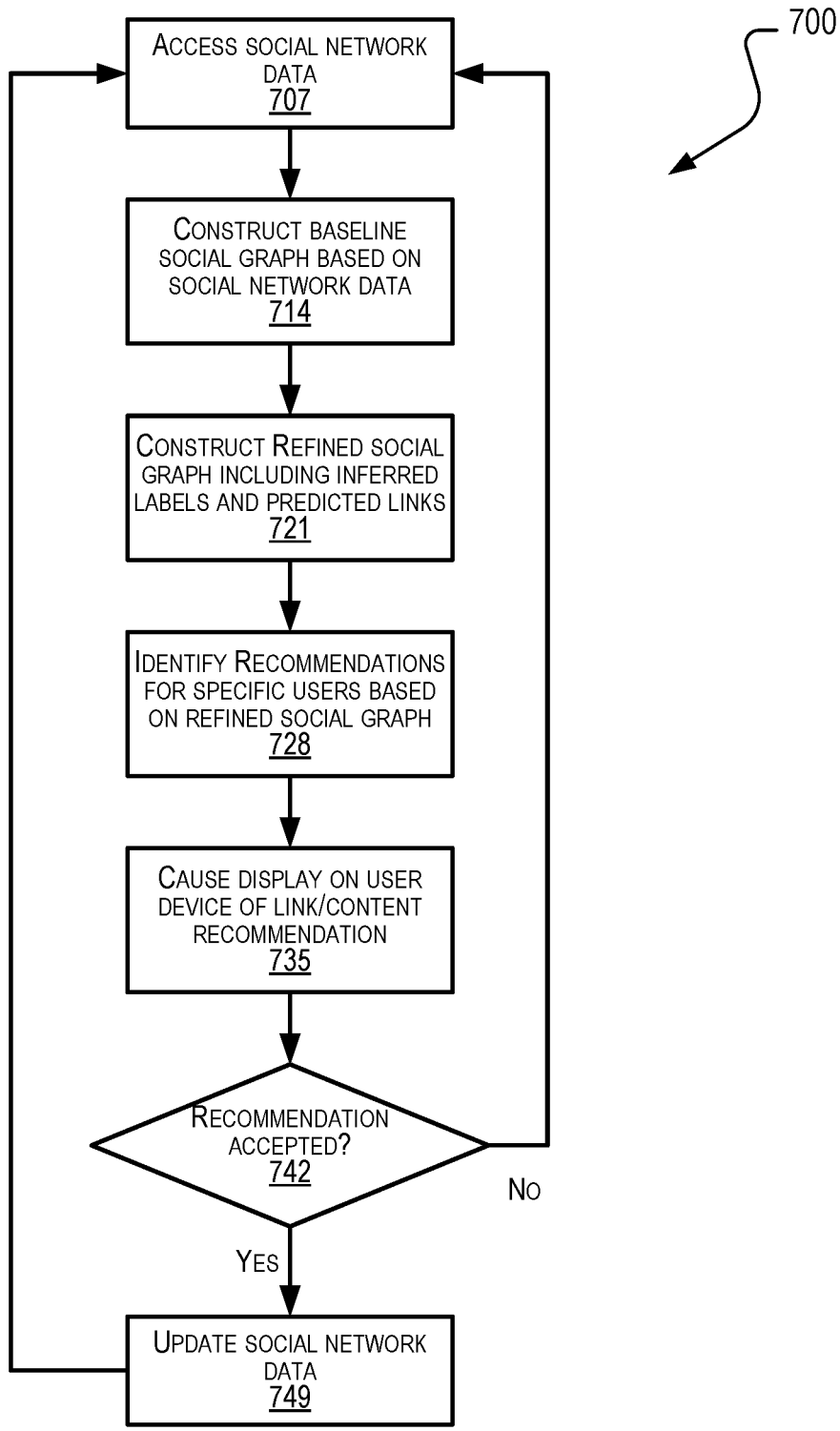
FIG. 7 is a high-level flowchart illustrating an example method for automated performance of recommendation actions in a social media application based on automated social graph refinement, according to one example embodiment.

Turning now to FIG. 7, the method 700 commences, at operation 604, with accessing social network data for multiple users of a social network platform or application. The social network data indicates attributes of and formal relationships between the users. At operation 714, a baseline social graph is constructed based on the social network data. Construction of the baseline social graph comprises the assignment of labels to respective users based on respective attributes, and the construction of links between respective users based on their formalized relationships as indicated by the social network data.

In this example embodiment, the graph construction operation includes, for at least some of labels associated with respective users, assigning respective graduated label values or weights representing a level of interaction of the respective user with content or material associated with the corresponding label. Likewise, graph construction this example embodiment includes, for at least some of the links, assigning respective graduated values representing a strength of the closeness of the corresponding relationship between the respective pair of users. Details of the graph construction operation 714 in this example embodiment are discussed at greater length below under the heading Social Graph Initialization.

At operation 721, a refined social graph is constructed by augmenting the baseline social graph with predicted links and inferred labels, using the GCLP framework set out above. As will be discussed in greater detail below with reference to FIG. 8, the graph refinement operation comprises alternating iterations of (a) optimizing label probabilities based at least in part (after the first iteration) on predicted links generated in a previous link prediction iteration, e.g. by use of Equation (3), and (b) optimizing link probabilities based at least in part on inferred labels generated in a previous label inference operation, e.g. by use of Equation (2).

Returning now to FIG. 7, the method 700 further comprises identifying, at operation 728, recommendations for specific users based on the refined social graph. Such identification in this example embodiment comprises identifying predicted links that have an above-threshold probability or weight value, but in which the relevant pair of users are not connected by a link in the baseline social graph. The method may further include, where multiple above-threshold predicted links exist for a particular user, prioritizing predicted links for recommendation based on the probabilities or weights of the respective predicted links.

Likewise, identification of content recommendations in this example embodiment comprises identifying inferred labels associated with users not previously connected to those labels. A threshold value for label probability is again applied in some instances, so that only above-threshold label probabilities are considered for content recommendation. Content recommendations may again be prioritized based on respective label probabilities.

At operation 735, the identified recommendations is provided to the respective users by causing display on their respective user devices 102 (FIG. 1) of the corresponding recommendations.

In this example embodiment, the provision of a link recommendation, at operation 735, comprises displaying in a graphical user interface of a social media application provided by the social network system 122 (FIG. 1) a graphical user interface element providing to the user the option to connect to respective users indicated by the identified predicted links. In one instance, each recommendation comprises display of the suggested friend user's name together with a user-selectable soft button to send an invitation or make a connection with the recommended user. Responsive to user-selection of the soft button, a link is established between the targeted user and the recommended friend user in the social network system 122. Thus, the method 700 includes determining, at operation 742, whether or not a particular recommendation is accepted, and, if so, updating the social network data accordingly, at operation 749.

Content recommendation similarly comprises causing display on the user device 102 of one or more user interface elements that are selectable by the user to interact with corresponding content. Examples of such content recommendations can include displaying hyperlink objects associated with respective products or media content (e.g., news stories, movies, books) identified based on inferred labels associated with the targeted user. Again, user interaction with content thus recommended causes automated updating of the social network data, at operation 749.

Figure 8:
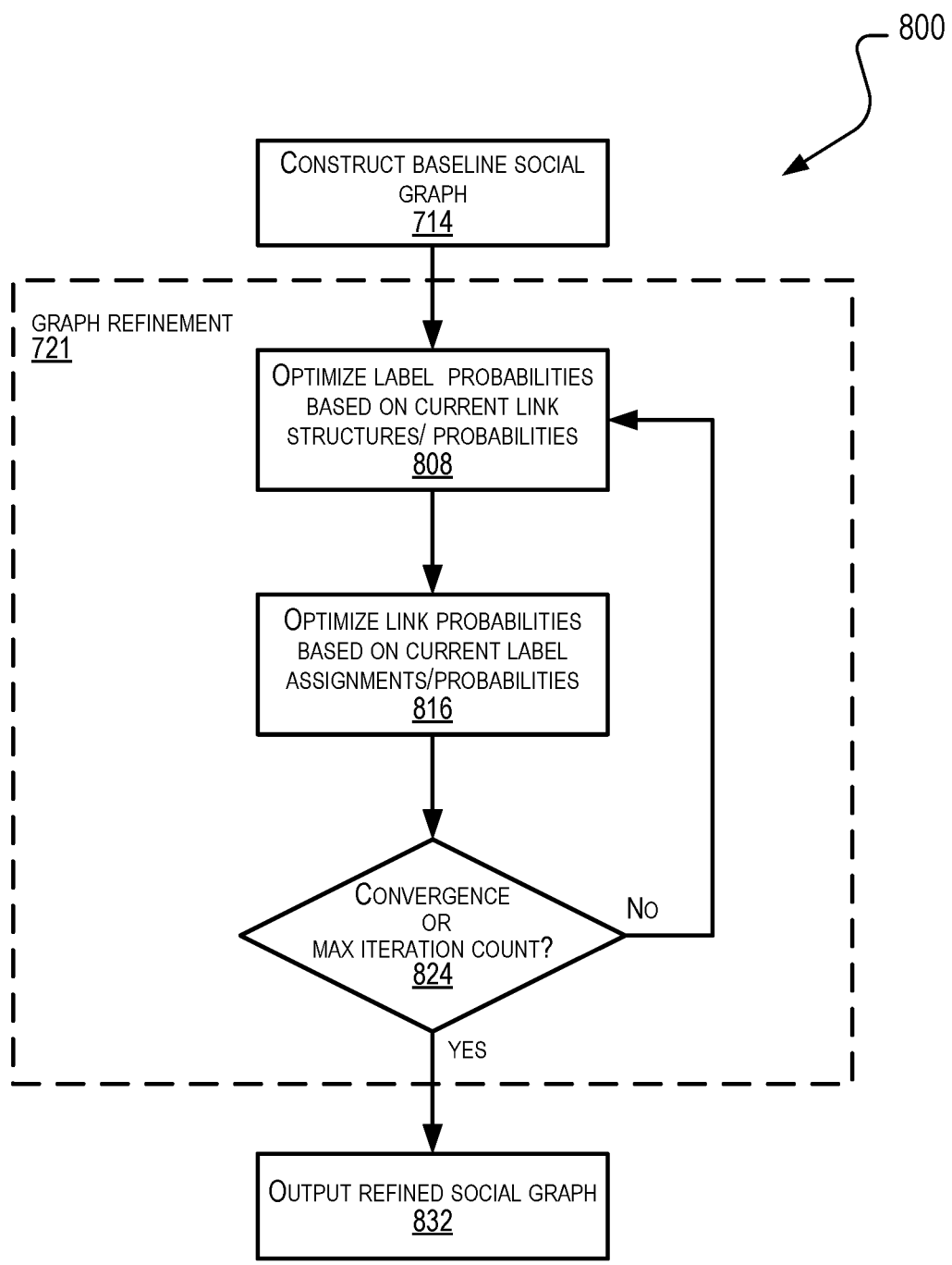
FIG. 8 is a flowchart illustrating an example method of automated iterative social graph refinement, according to one example embodiment

Turning now to FIG. 8, therein is shown a flowchart 800 of an example method for automated social graph refinement, according to embodiment. As mentioned previously, the method 800 comprises:

Step 0 (operation 714): Extract the links E and labels A from the given data. Initialize the link probabilities $W^0$ as E and label probabilities $Y^0$ as A. Initialize the iterator t=0 and set the maximum iterator T. Details of these operations are discussed below under the heading Social Graph Initialization.

Step 1 (operation 808): Using the current link structures implied by $W^t$ optimize the label probabilities as $y^{t+1}$ using label propagation according to Equation (2). Details of this operation are discussed below under the heading Label Inference via Label Propagation.

Step 2 (operation 816): Using the current label assignments implied by $Y^{t+1}$, optimize the link probabilities as $W^{t+1}$ using graph construction according to equation 1. Increment the iterator t=t+1. Details of this operation are discussed below under the heading Link Learning via Graph Construction.

Step 3 (operation 824): Repeat Step 1-2 until t=T or convergence. Thereafter, output the refined social graph, at operation 832.

Social Graph Initialization

Computation of A and E from the given data according to an example embodiment will now be described. In social networks, user labels can be extracted from various items of interest, e.g., user profiles (attributes) topically modeled posts (tweets, pictures, articles), semantically clustered contents (links clicked, pages viewed) and etc. For data indicating L such interesting items in a particular network, compute an L-dimensional vector $a_i$ for each user $v_i$. For important attributes, a label $l_j$ is generated for each common value (e.g., value Google for attribute company). For each $v_i$, a value of 1 is assigned to $a_{ij}$ if $v_i$ has the specific attribute value and 0 otherwise. For topical posts and clustered contents, a label is generated $l_k$ for each topic or cluster, and the number of times $t_{ik}$ that $v_i$ interacts with $l_k$ is counted (e.g., posting a tweet with a specific topic or clicking a link within a specific content group). It is assumed that for each $l_k$, $\{t_{ik}\}|V|$ of all users follow the power law distribution, where most users interact with $l_k$ in an average frequency while a small portion of users interact in very high frequencies. Therefore, the stress on large volumes of interactions made by the few users is demoted and we focus on small volumes around the average by using the sigmoid function adjusted to the range of [0, 1) as below.

$$a_{ij} = \sigma\left(\frac{t_{ij} - \min(t_{\cdot j})}{\bar{t}_{\cdot j} - \min(t_{\cdot j})}\right), \quad (4)$$

Where $$\sigma(x) = \frac{1 - e^{-x}}{1 + e^{-x}} \cdot t_{ij}$$

is shifted to [0, ∞) by deducting min (t.j) and then normalized by dividing $\bar{t}_{\cdot j}$–min($t_{\cdot j}$). The computation of E then follows. While we consider L labels, we only consider one type of link, i.e., friendship. Therefore, we set $e_{ij}$ to 1 if $v_i$ and $v_j$ are linked and 0 otherwise. However, we can also consider the communication frequency $c_{ij}$ among $v_i$ and $v_j$. Similarly, we assume power law distribution of $c_{ij}$ and compute $e_{ij}$ as $$e_{ij} = \sigma\left(\frac{c_{ij} - \min(c_{i\cdot})}{\bar{c}_{i\cdot} - \min(c_{i\cdot})}\right). \quad (5)$$

Label Inference via Label Propagation

Based on the graph structure described by link probabilities W, inferring user labels can be done through label propagation (LP) on graph. LP is a well-studied problem in graph-based semi-supervised learning. According to Eq. 2, we aim to learn a labeling functionfthat applies on all labeled and unlabeled nodes. The value off should be necessarily close to the true labels of labeled nodes, while changing smoothly among labeled and unlabeled nodes. In this example embodiment, an LP technique is employed that is analogous to that described by Zhou et al., in "Ranking on data manifolds," (*Advances in neural information processing systems* 16 (2004), 169-176), which implements the idea of transductive learning on graphs and is closely related to the famous PageRank algorithm associated with Google. Process 1 describes the LP process performed on the social graph.

---

Process 1: Label Propagation

1: procedure LP     ▷Input
    W: the current graph with weighted user links.
    $y^0$: the user labels to be propagated.
    α: the decay factor.
    T: the number of maximum iterations.
                  ▷Output
    $y^T$ : the inferred labels through propagation.
            ▷Symmetrically normalize W
2:   D ← the diagonal matrix with (i, i)-element equal to the sum of the i-th row of W
3:   S ← $D^{-1/2}WD^{-1/2}$
4:   for k = 1: L do
5:      for t = 1 : T do
6:         $y_{\cdot k}^t \leftarrow (1 - \alpha)y_{\cdot k}^0 + \alpha S y_{\cdot k}^{t-1}$
7:      end for
8:   end for
9: end procedure

---

In Steps 4-8, the L labels are propagated one by one, and $y_{\cdot k}$ is the row vector describing the probabilities of every user to possess label $l_k$. On small graphs where inversing a |V|×|V| matrix is possible, Step 5-7 can be replaced by $y_{\cdot k}^t \leftarrow (I-\alpha S)^{-1}y_{\cdot k}^0$, which directly yields the convergence solution. However, in graphs with millions of nodes as we consider, the inversion is problematic. More efficient implementation of LP is discussed below.

As indicated by Step 6, the learned labels $y_i$ of each node $v_i$ are consistent with labels on the neighbors of $v_i$, and the larger $w_{ij}$ is, the more similar $y_i$ and $y_j$ are. Therefore, the LP process well preserves smoothness on the graph from link closeness in W to label similarity in Y.

Link Learning Via Graph Construction

Based on label probabilities Y, we aim to learn user links by reconstructing the graph and refining edge weights using random walk transition probabilities as described by Eq. 1. By setting the derivative of w to zero, we can directly get:

$$w_{ij}=(1-\beta)e_{ij}+\beta p_{ij}, \quad (6)$$

where P is firstly updated with W fixed, and then W is updated with P fixed. However, the computation of $p_{ij}$ is non-trivial, which involves joining of all edges on the graph. While every path counts in traditional graph theory, in large graphs with billions of edges, it is usually unnecessary and too expensive to retrieve every path. Moreover, paths are of different importance for individual nodes. It is possible to just consider the top most important paths and deliver good performance.

To improve the efficiency of graph construction (GC), a novel edge sampling method is proposed for computing the transition probabilities. Unlike some existing techniques that samples edges by whether it should exist on a graph with respect to its weight, one example embodiment samples paths by whether the random walker will pass a specific component edge $e_{ij}$ at each step with respect to w.r.t. a certain probability $\theta_{ij}$.

Since in the current example GC process, each edge on the graph can be visited by random walkers for multiple times and thus become a part of multiple paths, sampling every time upon constructing each path gives more accurate approximations to the true path-wise transition probabilities. Furthermore, the sampling probability θ can be a fixed value for every considered edge, or any functions on node-edge triples, providing the flexibility of preferring certain paths for specific tasks.

The GC process is summarized in Process 2 below.

---
Process 2: Graph Construction

1: procedure GC ▷Input
   y: the current user labels.
   $W^0$: the user links to be reconstructed.
   β: the tradeoff factor.
   ▷Output
   $W^T$: the learned links through reconstruction.
   ▷ Adjust one-step transition probabilities in $W^0$
2:  for each $w_{ij}^0$ do
3:    $w_{ij}^1 \leftarrow w_{ij}^0 \cdot sim(y_i, y_j)$
4:  end for
   ▷Re-normalize the adjusted probabilities
5:  for each $v_i$ do
6:    $z_i \leftarrow 0$
7:    for each $v_j \in N(v_i)$ do
8:      $z_i \leftarrow z_i + w_{ij}^1$
9:    end for
10:   for each $v_j \in N(v_i)$ do
11:      $w_{ij}^1 \leftarrow w_{ij}^1/z_i$
12:   end for
13:  end for
   ▷Reconstruct the graph $W^T$
14:  $W^T = (1-\beta)W^0 + \beta W^1 \cdot W^1$
15:  end procedure
---

In step 3, as attribute similarity is used to adjust the one step transition probabilities, the random walker is required to 'prefer' edges connecting similarly labeled nodes. In this way, the GC process well preserves smoothness on the graph from attribute similarity in Y to link closeness in W. In other words, link closeness is expressed as a function at least in part of label similarity.

The normalization in Step 5-15 maintains the link probability interpretation of W, which effectively avoids the explosion of edge weights. The normalized weights still differentiate the closeness of different friends. Links with ignorable normalized weights are removed to keep the graph sparse. This may be achieved by applying a threshold filter to normalized weights. In this example embodiment, the graph refinement engine 124 empirically removes the links around each node with weights that are smaller than 1% of the largest weight.

Step 16 involves the multiplication of two sparse |V|×|V| matrixes matrices, which is computational expensive on graphs with millions of nodes. In this example embodiment, an efficient map-reduce pipeline with Spark is implemented. See further discussion in this regard under the heading Efficient Spark Implementation.

Optimality and Convergence

Note that the decomposition of the objective function into $J_{LP}$ and $J_{GC}$ largely simplifies the optimization problem. A brief discussion of the influence of this decomposition on the overall optimization objective will now follow.

The four quadratic terms in Equation (3) are all convex in W and Y, respectively. Therefore, following the linearity and composition rules of convexity, the overall objective function is convex. In the iterations of LP and GC (e.g., in operations 808 at 816, FIG. 8), the social graph refinement engine 124 updates W while fixing Y and vice versa. Although solving the optimization in iterations might be expected to break the convexity, use of the smoothness assumption as described has been found to have the effect that two the two processes can be expected to keep minimizing Equation (3).

Specifically, during the LP process (e.g., operation 808), Equation (2) clearly decreases. If we assume that in $\Sigma_{i,j}(w_{ij}-p_{ij})^2$, $w_{ij}$ is positively related to $p_{ij}$, according to smoothness from Y to W, then Eq. 1 should not increase. Similarly, during the GC process (e.g., operation 816), Equation (1) clearly decreases. If it is assumed that in $\Sigma_{i,j}w_{ij}(y_i-y_j)^2$, $(y_i-y_j)^2$ is negatively related to $w_{ij}$, according to smoothness from W to Y, then Equation (2) should not increase. Experiments on large data sets, the inventors observed quite stable performance of GCLP during multiple runs with random initializations on the same data.

The speed of convergence is influenced by the decay factor α in LP and trade-of factor β in GC. During experiments, the inventors observed that the example embodiment of GCLP usually achieves more than 80% optimal performance after three iterations and converges within eight iterations on very large data.

Efficient Spark Implementation

For major social networking applications, having social graphs consisting of millions of nodes and billions of edges, storing the social graph data in simple matrixes and running the described procedures on single machines are problematic, if not unfeasible. In some embodiments, GCLP procedures exemplified above are run on Spark with elaborately designed pipelines, leveraging the MapReduce and GraphX functions of Spark (see, e.g., Zaharia et al., "Spark: Cluster Computing with Working Sets," *HotCloud* 10 (2010), 10-10.)

For the LP process (e.g., operation 808, FIG. 8, as described in Process 1 above), inverting the |V|×|V| matrix is often unfeasible. Therefore, the iterative propagation mechanism as described in Process 1 Step, 5-7 is employed in this example embodiment. Moreover, since significant amounts of time is spent on repeatedly joining the vertex RDDs and edge RDDs when propagating each label, Step 4 and Step 5 are inverted and a map of all weighted labels is propagated at each iteration. This technique effectively improves the efficiency of LP by a factor almost similar to the total number of labels L on the graph. Moreover, an early stop is applied in some embodiments to further improve the efficiency of LP, and the inventors have found by experimentation that the number of iterations does not significantly affect the performance.

For the GC process (e.g., operation 816, as described in Process 2 above, multiplying the |V|×|V| matrixes is often unfeasible. In this example embodiment, a propagation based pipeline is used similar to that of LP to efficiently compute the two-step transition probabilities. Specifically, for each node, we generate a unique identity label and propagate it on the graph just like labels associated with common attributes. After two iterations of propagation, an identity label $l_i$ found on a node $v_j$ indicates a two-step path from $v_i$ to $v_j$. Analogous to the LP process, a map is used to store the identity labels with weighted edges, so the transition probabilities can be simply computed by adding up the values of the same keys. The edge sampling method is in some embodiments easily incorporated into the process by randomly sampling on the edges to propagate the identity labels at each step. The inventors have established that the sampling probability θ has a large impact on both the performance and efficiency of the GC process, and have found that a good tradeoff is achieved at around the value of 0.6.

An analysis now follows of the complexity of the GCLP framework on local machines, which may not be applicable in large networks. As will be evident from what has gone before, the GCLP framework basically consists of three steps: social graph initialization, label propagation and graph construction (e.g., operations 714, 808, and 816, FIG. 8). The complexities of pre-processing labels and links are O(|V|) and O(|E|), respectively. The major computation of LP lies in inversing the Laplacian matrix, which is usually $O(|V|^3)$, while can be improved to approximately $O(|V|^2)$ by leveraging link sparsity. GC takes $O(|E|^2)$ to compute the two-step transition probabilities. Since the maximal iteration can be set to expect certain optimality, the overall computation complexity of GCLP is $O(|V|^2+|E|^2)$, where |V| and |E| are the numbers of users and links in the network, respectively.

In truly huge networks with millions of nodes, the GCLP framework is implemented on Spark clusters with hundreds of nodes (e.g., 300 in one example embodiment). These novel graph propagation pipelines and edge sampling method further improve the efficiency of GCLP.

Data-Driven GCLP Submodels

In some embodiments, data-driven submodels can be integrated in the GCLP framework. Two such example data-driven submodels will now be described, namely (a) a dynamic activeness model which takes into account user activeness in friend making behaviors, and (b) an adaptive significance model which considers the significance of various attributes (i.e., labels).

Dynamic Activeness Model

This simple model is based on considering user activeness in friends making, predicting future friend making activity based on past friend making activity. How past linking activity influences future linking activity is not immediately clear. Specifically, making more friends in the past might indicate making more friends later, because activeness is lasting. But it may also lead to fewer new friends, because enough have been made. The present example dynamic activeness model, however, is based on the intuitions that 1) activeness in the past is positively correlated to activeness in the future; 2) activeness in the more recent past is more related to that in the future and 3) users' activeness changes dynamically over time.

The dynamic activeness model in this example embodiment thus assumes that 1) the more links a node made in the past, the more active it will be in the future and 2) the older the existing link is, the smaller influence the link has. These principles are represented mathematically as, $$\Phi(v_i) = \sum_{j: v_j \in N(v_i)} \exp\left(-\frac{\Delta t_{ij}}{\tau}\right). \quad (7)$$

where $N(v_i)$ is the set of neighbors of $v_i$, $\Delta t_{ij}$ is the time difference between the current time and the time of the creation of link $e_{ij}$, τ is a bandwidth parameter, controlling the decaying speed of the influence of old links. Δt's are float numbers in the unit of a day, which is dynamically computed before each GC process. The influence of old links dies out exponentially as the time difference gets large.

Adaptive Significance Model

GCLP performance is, in some embodiments, instead of or in addition improved by accounting for significance various attributes or label types. Thus, for instance different types of interests may not contribute in the same way to a user's friend making initiatives. For instance, people highly interested in a video game channel may be more likely to make friends with each other compared with people interested in a general news channel.

The contemplated difference in label significance is broadly analogous to the existing practice of TF-IDF weighting in information retrieval (see, for example, Leskovec, "Mining of Massive Data Sets," *Cambridge University Press*, 2014). TF-IDF weights the importance of a term T within a document D by multiplying a term frequency (TF) of T in D and dividing an inverse document frequency (IDF) as the number of all documents having T. Similar to TF-IDF, the significance of each label is in this example embodiment model as following, $$\Theta(l_i) = \frac{2L(l_i)}{N(l_i)^2}. \quad (8)$$

where $N(l_i)$ is the number of users having label $l_i$, and $L(l_i)$ is the number of links made among the $N(l_i)$ users. $N(l_i)^2/2$ approximates the number of all possible links that can be formed among the $N(l_{ik})$ users. Upon input data, this significance model works similar as TF-IDF, where the number of links contributes positively to the weight, and the number of nodes contributes negatively.

Integrating Submodels

The disclosed GCLP framework provides flexibility for integrating various sub-models developed under validated intuitions. In one example embodiment, in Process 2, step three, as the one step transition probabilities on the graph is adjusted, the activeness model is integrated by adding $\Phi(v_i)$ $\Phi(v_j)$ after sim($y_i,y_j$). Instead or, in this example embodiment, in addition, the significance model is integrated into the computation of sim($y_i,y_j$) through re-weighting each dimension of y according to θ(I.).

Example System, Architecture and Environment

FIG. 1 is a block diagram showing an example social media platform system in the example embodiment of a messaging system 100 for exchanging data (e.g., messages and associated content) over a network. The messaging system 100 includes multiple client devices 102, each of which hosts a number of applications including a social media client application 104. Each social media client application 104 is communicatively coupled to other instances of the social media client application 104 and a server system 108 via a network 106 (e.g., the Internet). An example graph refinement engine may be implemented as part of the messaging system 100.

Accordingly, each social media client application 104 is able to communicate and exchange data with another social media client application 104 and with the server system 108 via the network 106. The data exchanged between messaging client applications 104, and between a social media client application 104 and the server system 108, includes functions (e.g., commands to invoke functions) as well as payload data (e.g., text, audio, video or other multimedia data).

The server system 108 provides server-side functionality via the network 106 to a particular social media client application 104. While certain functions of the messaging system 100 are described herein as being performed by either a social media client application 104 or by the server system 108, it will be appreciated that the location of certain functionality either within the social media client application 104 or the server system 108 is a design choice. For example, it may be technically preferable to initially deploy certain technology and functionality within the server system 108, but to later migrate this technology and functionality to the social media client application 104 where a client device 102 has a sufficient processing capacity.

The server system 108 supports various services and operations that are provided to the social media client application 104. Such operations include transmitting data to, receiving data from, and processing data generated by the social media client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the social media client application 104.

Turning now specifically to the server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the social media client application 104 in order to invoke functionality of the application server 112. The Application Program Interface (API) server 110 exposes various functions supported by the application server 112, including account registration, login functionality, the sending of messages, via the application server 112, from a particular social media client application 104 to another social media client application 104, the sending of media files (e.g., images or video) from a social media client application 104 to the messaging server application 114, and for possible access by another social media client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the social media client application 104).

The application server 112 hosts a number of applications and subsystems, including a messaging server application 114, an image processing system (not shown), and a social network system 122. The social network system in this example includes a graph refinement engine 124 that includes a dynamic graph refinement engine comprising hardware configured to implement the techniques disclosed and described above and in Appendix A. The social network system 122 further includes a recommendation engine 129 configured to identify content recommendations and social networking recommendations to users of a social media platform provided by the application server 112, as described in greater detail later in. In this example embodiment, the graph refinement engine 124 and the recommendation engine 129 are instantiated by respective software modules executing on dynamically reconfigurable computer processors, such that when the computer readable instructions stored on a memory of the system is executed by the one or more computer processors, the computer processors provide hardware components that are temporarily configured to perform the automated operations described previously with respect to FIGS. 7 and 8. In other embodiments, the recommendation engine 129 and/or the graph refinement engine 124 can be provided by computer processors that are permanently configured to perform the described automated operations, for example by way of application-specific integrated circuits.

The messaging server application 114 implements a number of message processing technologies and functions, particularly related to the aggregation and other processing of content (e.g., textual and multimedia content) included in messages received from multiple instances of the social media client application 104. As will be described in further detail, the text and media content from multiple sources may be aggregated into collections of content (e.g., called stories or galleries). These collections are then made available, by the messaging server application 114, to the social media client application 104. Other processor and memory intensive processing of data may also be performed server-side by the messaging server application 114, in view of the hardware requirements for such processing.

The application server 112 also includes an image processing system that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses a user graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Figure 2:
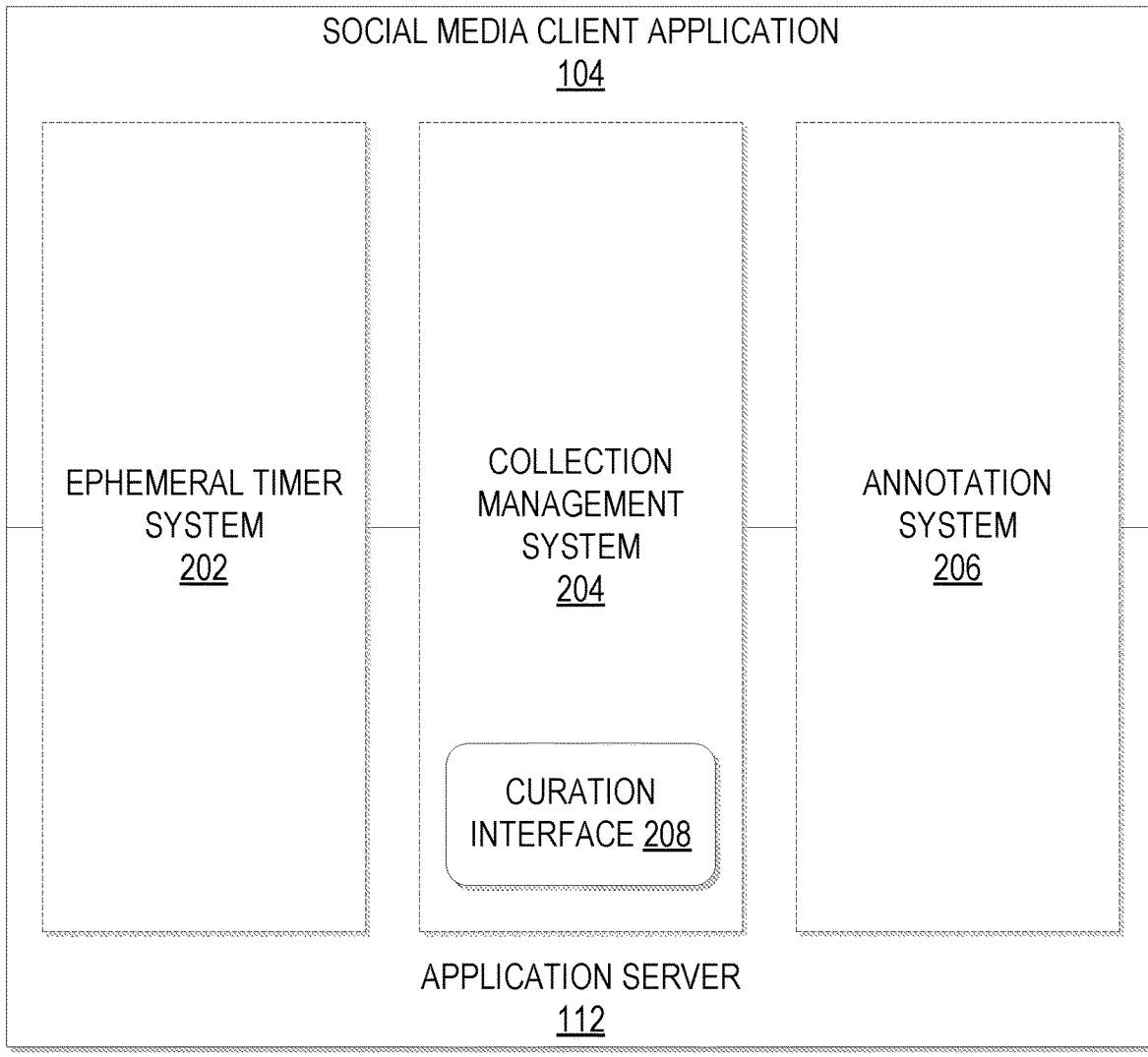
FIG. 2 is block diagram illustrating further details regarding a social media application system, according to example embodiments.

FIG. 2 is block diagram illustrating further details regarding the messaging system 100, according to example embodiments. Specifically, the messaging system 100 is shown to comprise the social media client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the social media client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the social media client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the social media client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the social media client application 104 based on a geolocation of the client device 102. In another example, the annotation system 206 operatively supplies a media overlay to the social media client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
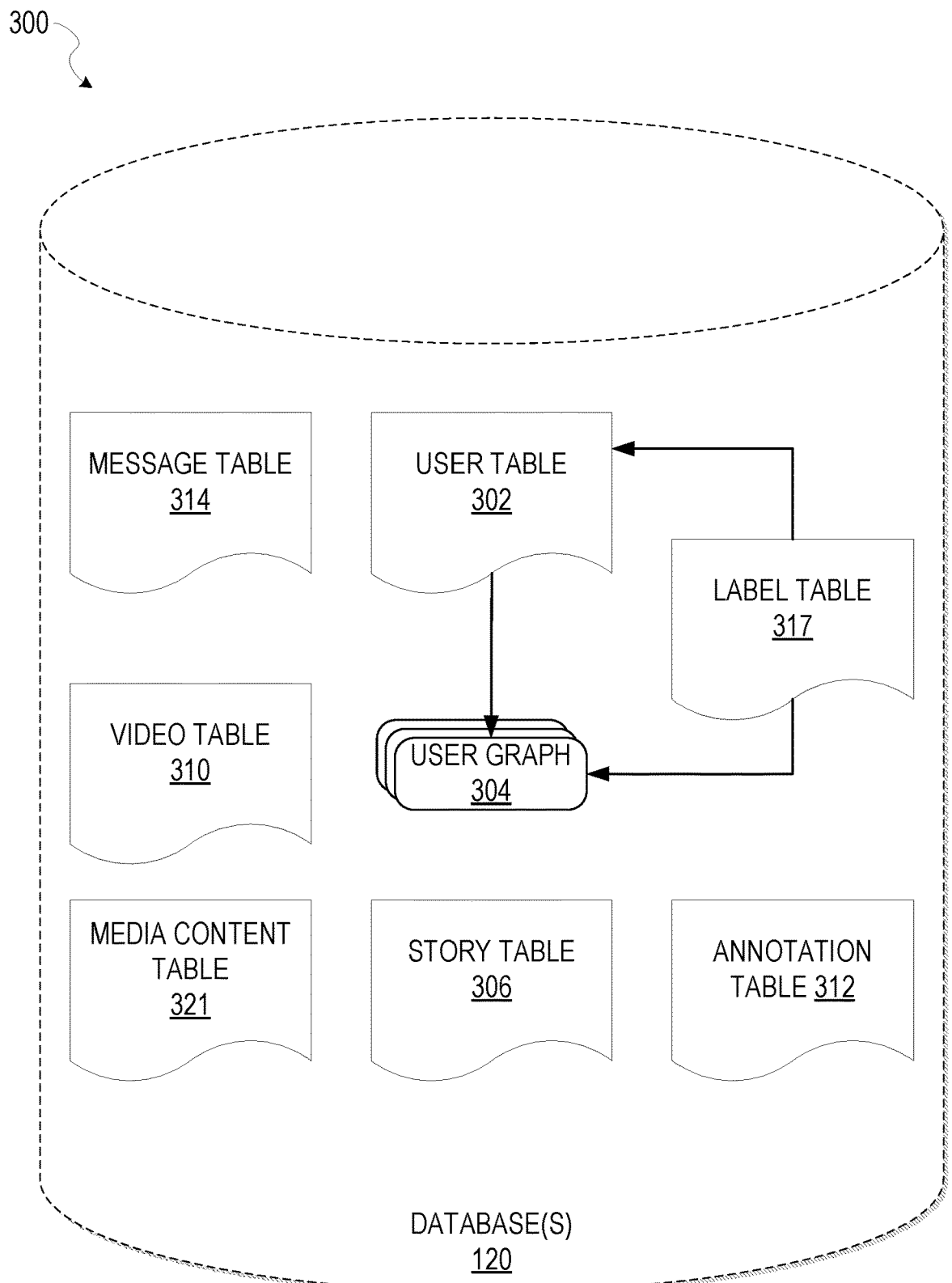
FIG. 3 is a schematic diagram illustrating data which may be stored in a database of the social media application system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 which may be stored in the database 120 of the server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The user table 302 stores entity data, including a user graph 304. Entities for which records are maintained within the user table 302 may include individuals, corporate entities, organizations, objects, places, events etc. Regardless of type, any entity regarding which the server system 108 stores data may be a recognized entity. Each entity is provided with a unique identifier, as well as an entity type identifier (not shown).

The user graph 304 furthermore stores information regarding relationships and associations between entities. Such relationships may be social, professional (e.g., work at a common corporation or organization) interested-based or activity-based, merely for example. In this example embodiment, a refined social graph produced by the disclosed techniques may be used by the social networking system 122 to suggest friend connection or topics/items of interest to respective users. The database 120 further includes a label table 317 that includes label information with respect to the multiple users included in the user table. As discussed elsewhere in this description, such labels associated specific respective attributes to the associated users, and may include interests, demographic information, and the like. The database 120 yet further includes a media content table 321 that includes media content (e.g., news stories, articles, product recommendations, and the like) available for consumption by the respective users upon request or responsive to recommendations provided by the system.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the social media client application 104 when the sending user is composing a message. Other types of filers include geolocation filters (also known as geo-filters) which may be presented to a sending user based on geographic location. For example, geolocation filters specific to a neighborhood or special location may be presented within a user interface by the social media client application 104, based on geolocation information determined by a GPS unit of the client device 102. Another type of filer is a data filer, which may be selectively presented to a sending user by the social media client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the user table 302. The user table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the user table 302) A user may create a "personal story" in the form of a collection of content that has been created and sent/broadcast by that user. To this end, the user interface of the social media client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the social media client application 104, to contribute content to a particular live story. The live story may be identified to the user by the social media client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
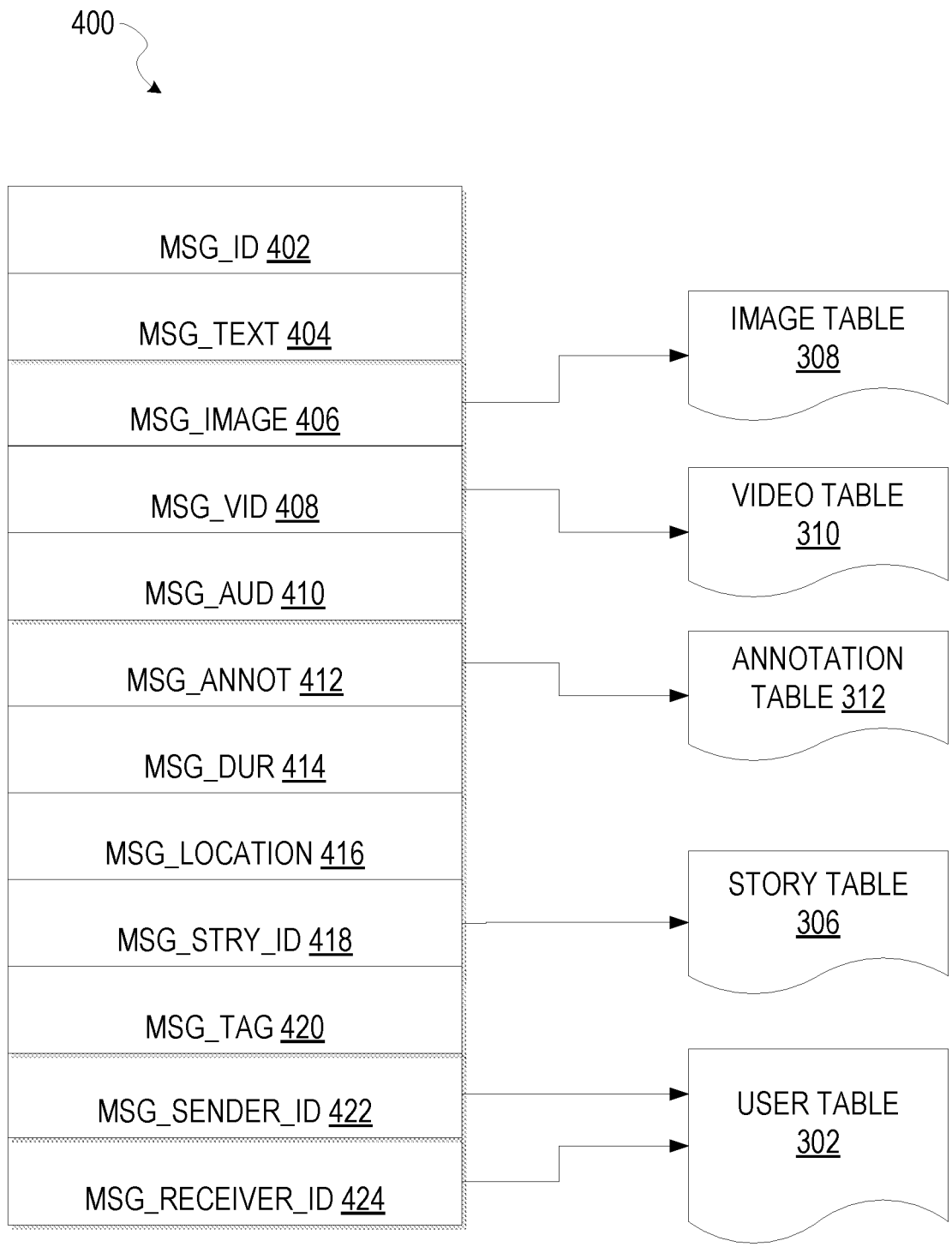
FIG. 4 is a schematic diagram illustrating a structure of a message, according to some embodiments, generated by a social media client application, according to certain example embodiments.

FIG. 4 is a schematic diagram illustrating a structure of a message 400, according to some in some embodiments, generated by a social media client application 104 for communication to a further social media client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the social media client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

- A message sender identifier 422: an identifier (e.g., a messaging system identifier, email address or device identifier) indicative of a user of the client device 102 on which the message 400 was generated and from which the message 400 was sent
- A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an user table 302.

Figure 5:
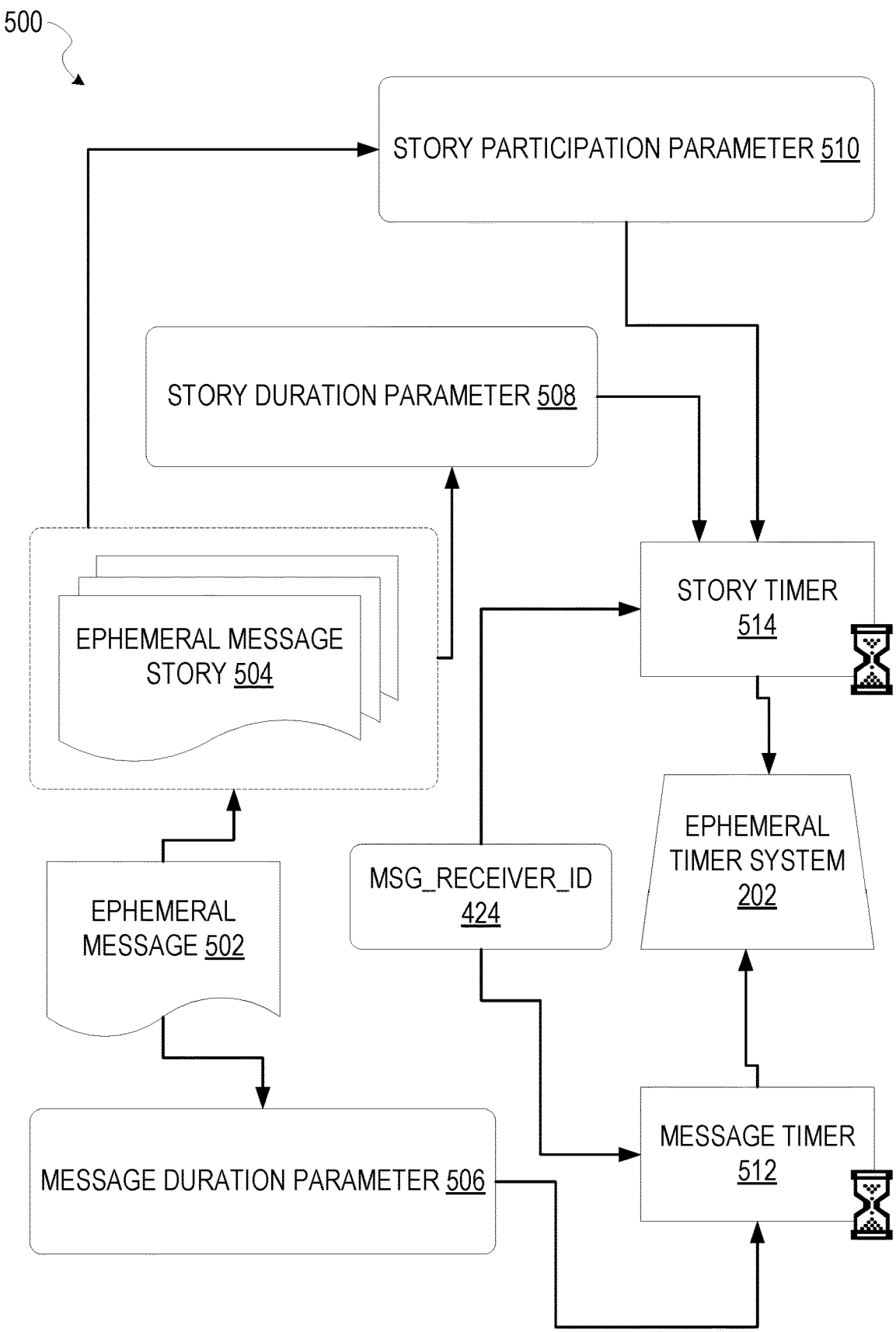
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the social media client application 104. In one embodiment, where the social media client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the messaging system 100 (and, for example, specifically the social media client application 104 to cause an indicium (e.g., an icon) associated with the relevant ephemeral message story 504 to no longer be displayed within a user interface of the social media client application 104. Similarly, when the ephemeral timer system 202 determines that the message duration parameter 506 for a particular ephemeral message 502 has expired, the ephemeral timer system 202 causes the social media client application 104 to no longer display an indicium (e.g., an icon or textual identification) associated with the ephemeral message 502.

Software Architecture

Figure 9:
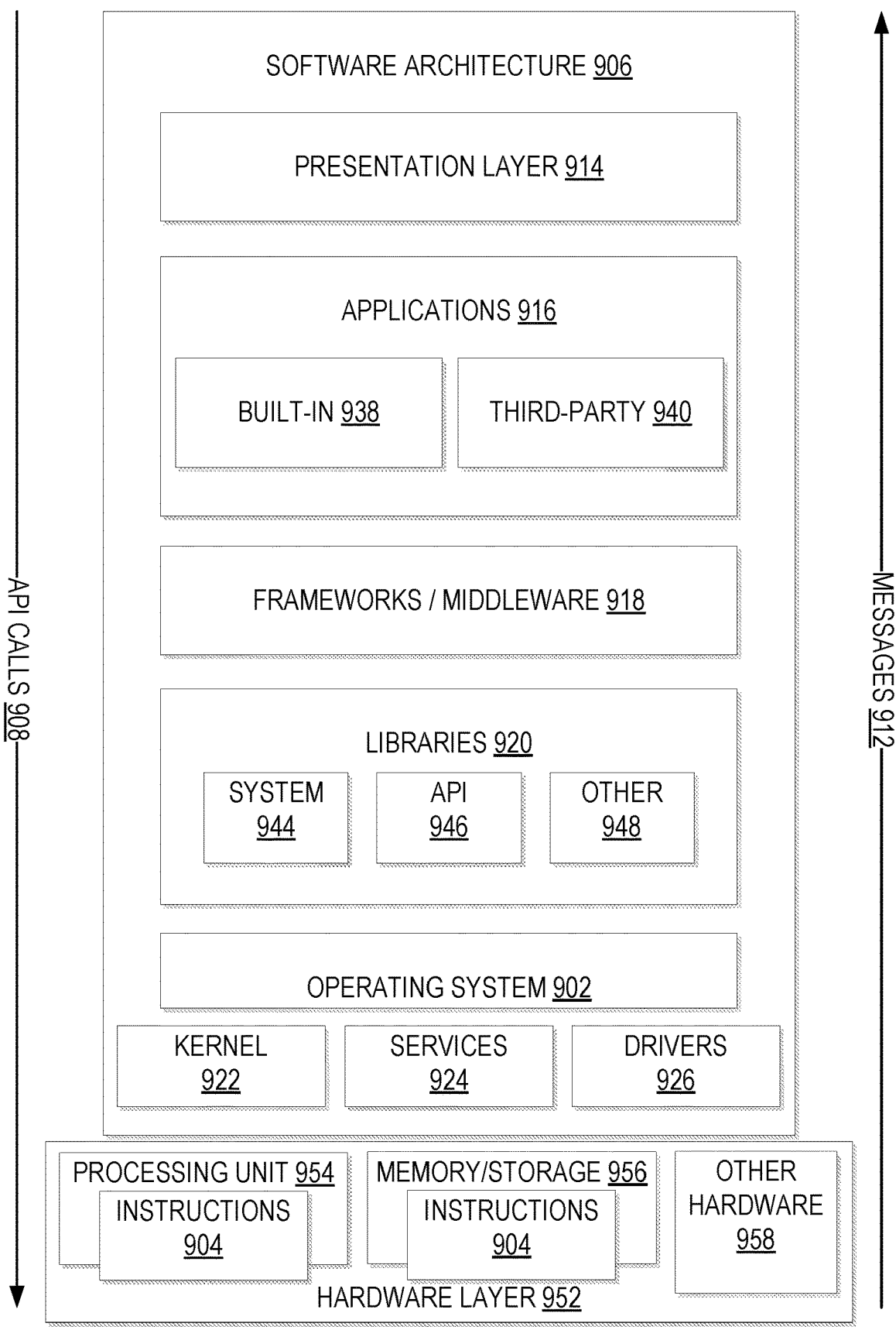
FIG. 9 is a block diagram illustrating a representative software architecture, which may be used in conjunction with various hardware architectures herein described.

FIG. 9 is a block diagram illustrating an example software architecture 606, which may be used in conjunction with various hardware architectures herein described. FIG. 9 is a non-limiting example of a software architecture and it will be appreciated that many other architectures may be implemented to facilitate the functionality described herein. The software architecture 606 may execute on hardware such as machine 900 of FIG. 10 that includes, among other things, processors 904, memory 914, and I/O components 918. A representative hardware layer 652 is illustrated and can represent, for example, the machine 900 of FIG. 10. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory and/or storage modules memory/storage 656, which also have executable instructions 604. The hardware layer 652 may also comprise other hardware 658.

In the example architecture of FIG. 9, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 and/or other components within the layers may invoke application programming interface (API) API calls 608 through the software stack and receive a response as in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

Figure 10:
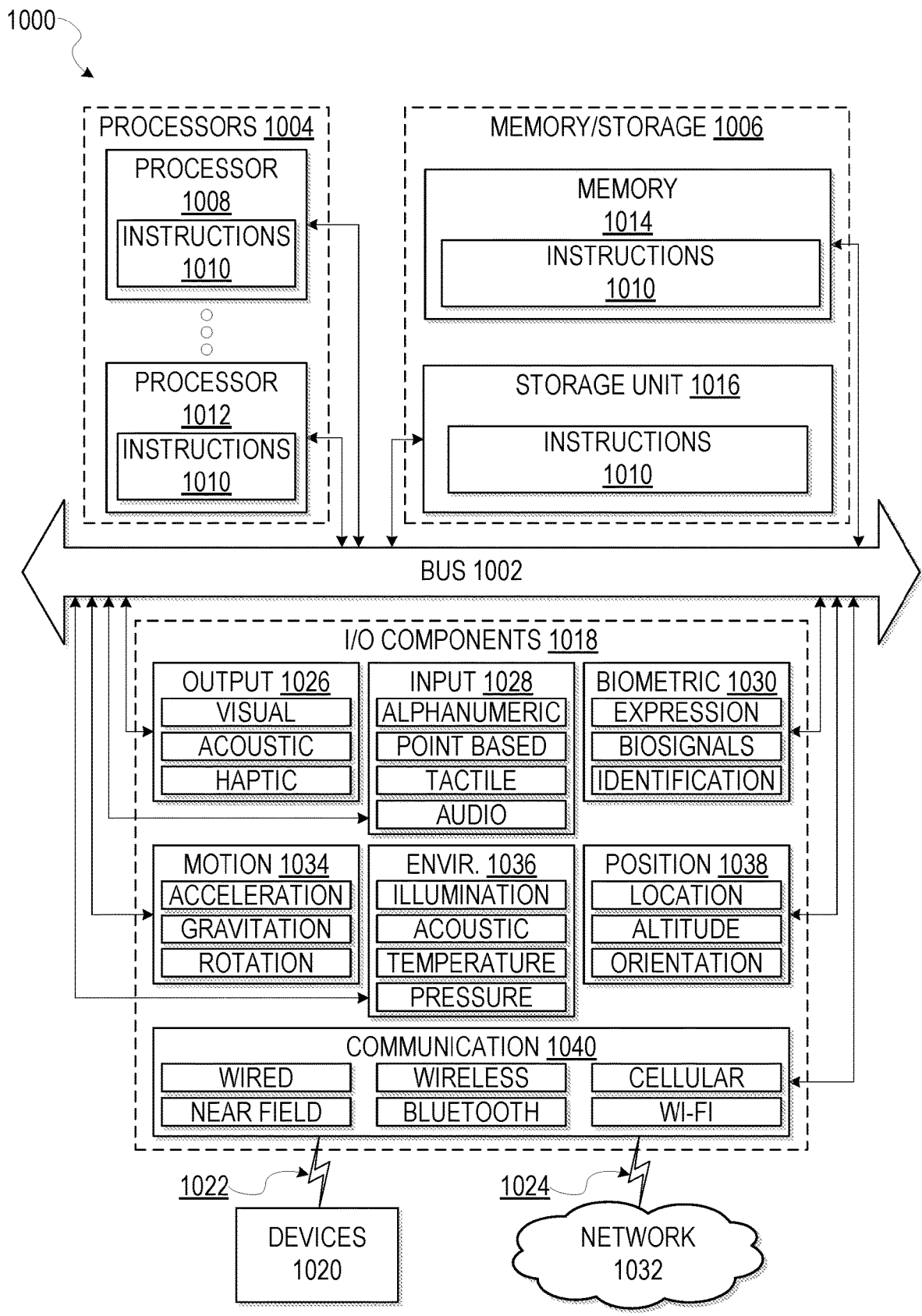
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 900, according to some example embodiments, able to read instructions from a machine-readable medium (e.g., a machine-readable storage medium) and perform any one or more of the methodologies discussed herein. Specifically, FIG. 10 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 10. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. Thus, for example, the social network system 122, the graph refinement engine 124, and/or the recommendation engine 129 may in some embodiments comprise one or more hardware components of a computer system temporarily configured by execution of software there on to provide the respective systems, engines, or modules. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
  accessing a baseline social graph modeling relationships and attributes of multiple users of a social network application, the baseline social graph comprising:
    nodes representing respective users of the social network application;
    links representing established relationships between the users of the social network application, each link extending between a corresponding pair of nodes; and
    labels associated with the nodes, each label being associated with one or more of the nodes to indicate a corresponding attribute of the one or more associated nodes;
  in an automated refinement operation performed using a graph refinement engine comprising one or more computer processors configured to perform the refinement operation, dynamically refining the baseline social graph by augmenting the baseline social graph with predicted links and with inferred labels, thereby constructing a refined social graph, the refinement operation comprising:
    defining a graph smoothness objective expression having cumulative terms comprising:

a label propagation objective function indicative of label similarity, the label propagation objective function being a function, at least in part, of link closeness; and a graph construction objective function indicative of link closeness between respective nodes, wherein link closeness is indicative of path-wise proximity of respective nodes, the graph construction objective function being a function, at least in part, of label similarity; and based at least in part on the objective expression, optimizing the graph smoothness objective expression by performing iterative operations of alternately:

in a label inference iteration, inferring labels using the graph construction objective function and based at least in part on predicted links generated in a previous link prediction iteration; and in a link prediction iteration, predicting links using the graph construction objective function and based at least in part on inferred labels generated in a previous label inference iteration; and in an automated recommendation operation performed using a recommendation engine comprising one or more computing devices configured to perform the recommendation operation:

generating a recommendation for a particular one of the users based at least in part on automated analysis of the refined social graph; and causing display of the recommendation on a user device associated with the particular user.

2. The method of claim 1, wherein the link prediction iterations are probabilistic, each predicted link having an associated probability value indicating a predicted closeness on the graph between the corresponding pair of nodes.

3. The method of claim 2, wherein the label inference iterations are probabilistic, each inferred label having an associated probability value indicating an estimated probability of existence of the inferred label in association with the corresponding node.

4. The method of claim 3, wherein the label inference iteration comprises inferring for each node a label vector comprising respective probability values for each of a plurality of labels, label similarity between each pair of nodes being indicated by similarity between the label vectors of the respective nodes.

5. The method of claim 1, wherein each label inference iteration comprises:

optimizing the label propagation objective function indicative of label similarity as a function of link closeness on the graph, thereby optimizing respective label probabilities constrained at least in part by corresponding link closeness.

6. The method of claim 5, wherein each link prediction iteration comprises:

optimizing the graph construction objective function indicative of link closeness as a function of label similarity, thereby optimizing respective link probabilities constrained at least in part by corresponding label similarities.

7. The method of claim 3, further comprising iteratively performing a normalization operation on the refined social graph, thereby to maintain probability interpretations of both label similarity and link closeness.

8. The method of claim 7, further comprising performing a regularization operation with respect to the refined social graph for at least some iterations, thereby to counteract over-construction of the graph.

9. The method of claim 1, further comprising the prior operations of:

accessing social network data indicating associated attributes of and formal relationships between the multiple users of the social network application;

in an automated graph construction operation performed using a graph constructor comprising at least one computer processor configured to perform the automated graph construction operation, constructing the baseline graph based on the social network data.

10. The method of claim 9, wherein the graph construction operation comprises, for at least some of the labels associated with a respective user, assigning respective graduated label values representing a level of interaction of the respective user with the corresponding label.

11. The method of claim 9, wherein the graph construction operation comprises, for at least some of the links representing established formal relationships between the respective pairs of users, assigning respective graduated strength values representing a strength of the relationship between the respective pair of users.

12. A system comprising:

a memory on which is stored social graph information indicating a baseline social graph that models relationships and attributes of multiple users of a social network application, the baseline social graph comprising:

nodes representing respective users of the social network application;

links representing established relationships between the users of the social network application, each link extending between a corresponding pair of nodes; and labels associated with the nodes, each label being associated with one or more of the nodes to indicate a corresponding attribute of the one or more associated nodes;

a graph refinement engine comprising one or more computer processors configured to perform an automated refinement operation in which a refined social graph is constructed by augmenting the baseline social graph with predicted links and with inferred labels, the refinement operation comprising:

defining a graph smoothness objective expression having cumulative terms comprising:

a label propagation objective function indicative of label similarity, the label propagation objective function being a function, at least in part, of link closeness; and a graph construction objective function indicative of link closeness between respective nodes, wherein link closeness is indicative of path-wise proximity of respective nodes, the graph construction objective function being a function, at least in part, of label similarity; and based at least in part on the objective expression, optimizing the graph smoothness objective expression by performing iterative operations of alternately:

in a label inference iteration, inferring labels using the graph construction objective function and based at least in part on predicted links generated in a previous link prediction iteration; and in a link prediction iteration, predicting links using the graph construction objective function and based at least in part on inferred labels generated in a previous label inference iteration; and a recommendation engine comprising one or more computing devices configured to perform automated operations comprising:
generating a recommendation for a particular one of the users based at least in part on automated analysis of the refined social graph; and
causing display of the recommendation on a user device associated with the particular user.

13. The system of claim 12, wherein the recommendation engine is configured to generate a media content recommendation based at least in part on one or more inferred labels associated with the particular user in the refined social graph.

14. The system of claim 12, wherein the recommendation engine is configured to generate link recommendation a based at least in part on one or more predicted links forming part of the refined social graph, the link recommendation providing an option to the particular user to form a formal connection in the social network application with another user to whom the particular user is not linked in the baseline social graph.

15. The system of claim 12, wherein the graph refinement engine is configured to, in each label inference iteration:
optimize the label propagation objective function indicative of label similarity as a function of link closeness on the graph, thereby optimizing respective label probabilities constrained at least in part by corresponding link closeness.

16. The system of claim 15, wherein the graph refinement engine is configured to, in each link prediction iteration:
optimize the graph construction objective function indicative of link closeness as a function of label similarity, thereby optimizing respective link probabilities constrained at least in part by corresponding label similarities.

17. The system of claim 12, wherein the graph refinement engine is further configured to iteratively perform a normalization operation on the refined social graph, thereby to maintain probability interpretations of both label similarity and link closeness.

18. A non-transitory computer readable storage medium having stored thereon instructions for causing a machine, when executing the instructions, to perform operations comprising:

accessing a baseline social graph modeling relationships and attributes of multiple users of a social network application, the baseline social graph comprising:
nodes representing respective users of the social network application;
links representing established relationships between the users of the social network application, each link extending between a corresponding pair of nodes; and
labels associated with the nodes, each label being associated with one or more of the nodes to indicate a corresponding attribute of the one or more associated nodes;
dynamically refining the baseline social graph by augmenting the baseline social graph with predicted links and with inferred labels, thereby constructing a refined social graph, the refinement operation comprising:
defining a graph smoothness objective expression having cumulative terms comprising:
a label propagation objective function indicative of label similarity, the label propagation objective function being a function, at least in part, of link closeness; and
a graph construction objective function indicative of link closeness between respective nodes, wherein link closeness is indicative of path-wise proximity of respective nodes, the graph construction objective function being a function, at least in part, of label similarity; and
based at least in part on the objective expression, optimizing the graph smoothness objective expression by performing iterative operations of alternately:
in a label inference iteration, inferring labels using the graph construction objective function and based at least in part on predicted links generated in a previous link prediction iteration; and
in a link prediction iteration, predicting links using the graph construction objective function and based at least in part on inferred labels generated in a previous label inference iteration;
generating a recommendation for a particular one of the users based at least in part on automated analysis of the refined social graph; and
causing display of the recommendation on a user device associated with the particular user.

* * * * *